United States Patent
Colgrove et al.

(10) Patent No.: US 11,579,974 B1
(45) Date of Patent: *Feb. 14, 2023

(54) DATA PROTECTION USING INTRA-DEVICE PARITY AND INTRA-DEVICE PARITY

(71) Applicant: PURE STORAGE, INC., Mountain View, CA (US)

(72) Inventors: John Colgrove, Los Altos, CA (US); John Hayes, Mountain View, CA (US); Bo Hong, Palo Alto, CA (US); Ethan Miller, Santa Cruz, CA (US)

(73) Assignee: PURE STORAGE, INC., Mountain View, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/075,449

(22) Filed: Oct. 20, 2020

Related U.S. Application Data

(63) Continuation of application No. 16/863,695, filed on Apr. 30, 2020, now Pat. No. 10,817,375, which is a
(Continued)

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC .... G06F 11/1076; G06F 3/0619; G06F 3/064; G06F 3/0689
See application file for complete search history.

(56) References Cited

U.S. PATENT DOCUMENTS

| 5,208,813 A | 5/1993 | Stallmo |
| 5,403,639 A | 4/1995 | Belsan et al. |

(Continued)

FOREIGN PATENT DOCUMENTS

| CN | 103370685 A | 10/2013 |
| CN | 103370686 A | 10/2013 |

(Continued)

OTHER PUBLICATIONS

Ganger et al.; "Disk Arrays High Performance, High-Reliability Storage Subsystems", Computer IEEE Service Center, Los Alamitos, CA; vol. 27, No. 3, Mar. 1, 1994.
(Continued)

*Primary Examiner* — Craig S Goldschmidt

(57) ABSTRACT

A system and method for offset protection data in a RAID array. A computer system comprises client computers and data storage arrays coupled to one another via a network. A data storage array utilizes solid-state drives and Flash memory cells for data storage. A storage controller within a data storage array is configured to store user data in a first page of a first storage device of the plurality of storage devices; generate intra-device protection data corresponding to the user data, and store the intra-device protection data at a first offset within the first page. The controller is further configured to generate inter-device protection data corresponding to the first page, and store the inter-device protection data at a second offset within a second page in a second storage device of the plurality of storage devices, wherein the first offset is different from the second offset.

20 Claims, 15 Drawing Sheets

Related U.S. Application Data continuation of application No. 16/231,027, filed on Dec. 21, 2018, now Pat. No. 10,810,083, which is a continuation of application No. 14/967,848, filed on Dec. 14, 2015, now Pat. No. 10,180,879, which is a continuation of application No. 12/892,895, filed on Sep. 28, 2010, now Pat. No. 9,244,769.

(56) References Cited

U.S. PATENT DOCUMENTS

| | | |
|---|---|---|
| 5,490,260 A * | 2/1996 | Miller .................. H03M 7/3086 |
| | | 711/100 |
| 5,822,782 A | 10/1998 | Humlicek et al. |
| 5,940,838 A | 8/1999 | Schmuck et al. |
| 6,263,350 B1 | 7/2001 | Wollrath et al. |
| 6,275,898 B1 | 8/2001 | DeKoning |
| 6,412,045 B1 | 6/2002 | DeKoning et al. |
| 6,681,290 B2 | 1/2004 | Brower, Jr. et al. |
| 6,718,448 B1 | 4/2004 | Ofer |
| 6,757,769 B1 | 6/2004 | Ofer |
| 6,799,283 B1 | 9/2004 | Tamai et al. |
| 6,834,298 B1 | 12/2004 | Singer et al. |
| 6,850,938 B1 | 2/2005 | Sadjadi |
| 6,854,071 B2 | 2/2005 | King et al. |
| 6,915,434 B1 | 7/2005 | Kuroda et al. |
| 6,938,123 B2 | 8/2005 | Willis et al. |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,055,035 B2 * | 5/2006 | Allison .................. G06F 21/64 |
| | | 713/1 |
| 7,200,715 B2 | 4/2007 | Kleiman et al. |
| 7,206,991 B2 | 4/2007 | Chatterjee et al. |
| 7,216,164 B1 | 5/2007 | Whitmore et al. |
| 7,484,137 B2 | 1/2009 | Blaum et al. |
| 7,506,187 B2 | 3/2009 | Maddock |
| 7,681,072 B1 | 3/2010 | Gibson et al. |
| 7,783,682 B1 | 8/2010 | Patterson |
| 7,873,619 B1 | 1/2011 | Faibish et al. |
| 7,913,300 B1 | 3/2011 | Flank et al. |
| 7,930,475 B1 | 4/2011 | Kleiman et al. |
| 7,933,936 B2 | 4/2011 | Aggarwal et al. |
| 7,958,303 B2 | 6/2011 | Schuster |
| 7,979,613 B2 | 7/2011 | Zohar et al. |
| 8,015,440 B2 | 9/2011 | Flynn et al. |
| 8,019,938 B2 | 9/2011 | Flynn et al. |
| 8,037,391 B1 | 10/2011 | Jung et al. |
| 8,086,652 B1 | 12/2011 | Bisson et al. |
| 8,117,464 B1 | 2/2012 | Kogelnik |
| 8,200,887 B2 | 6/2012 | Bennett |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | LeCrone et al. |
| 9,081,713 B1 | 7/2015 | Bennett |
| 9,189,334 B2 | 11/2015 | Bennett |
| 9,244,769 B2 | 1/2016 | Colgrove et al. |
| 9,311,182 B2 | 4/2016 | Bennett |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,632,870 B2 | 4/2017 | Bennett |
| 10,180,879 B1 | 1/2019 | Colgrove et al. |

| | | |
|---|---|---|
| 2002/0038436 A1 | 3/2002 | Suzuki |
| 2002/0069318 A1 * | 6/2002 | Chow .................. G06F 3/0664 |
| | | 711/104 |
| 2002/0087544 A1 | 7/2002 | Selkirk et al. |
| 2002/0178335 A1 | 11/2002 | Selkirk et al. |
| 2003/0115412 A1 | 6/2003 | Franklin et al. |
| 2003/0140209 A1 | 7/2003 | Testardi |
| 2004/0049572 A1 | 3/2004 | Yamamoto et al. |
| 2004/0255087 A1 | 12/2004 | Pudipeddi et al. |
| 2005/0066095 A1 | 3/2005 | Mullick et al. |
| 2005/0108594 A1 | 5/2005 | Menon et al. |
| 2005/0210322 A1 | 9/2005 | Corrado |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0143507 A1 | 6/2006 | Tanaka |
| 2006/0150048 A1 | 7/2006 | Echeruo et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0040540 A1 * | 2/2008 | Cavallo ............... G06F 11/1435 |
| | | 711/173 |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | Frese et al. |
| 2009/0183051 A1 | 7/2009 | Balb |
| 2009/0198886 A1 * | 8/2009 | Balakrishnan .......... G06F 3/064 |
| | | 711/E12.001 |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0079190 A1 | 3/2012 | Colgrove et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |

(56) References Cited

U.S. PATENT DOCUMENTS

| | | |
|---|---|---|
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3082047 A1 | 10/2016 |
| EP | 3120235 B1 | 1/2017 |
| EP | 3066610 B1 | 6/2018 |
| JP | 2007087036 A | 4/2007 |
| JP | 2007094472 A | 4/2007 |
| JP | 2008250667 A | 10/2008 |
| JP | 2010211681 A | 9/2010 |
| WO | 1995002349 A1 | 1/1995 |
| WO | 1999013403 A1 | 3/1999 |
| WO | 2008102347 A1 | 8/2008 |
| WO | 2010071655 A1 | 6/2010 |
| WO | 2012047498 A1 | 4/2012 |

OTHER PUBLICATIONS

Gray et al.; "Parity Striping of Disc Arrays: Low Cost Reliable Storage with Acceptable Throughput", Proceedings of the 17th International Conference on Very Large Data Bases, Sep. 3-6, 1991, Barcelona, San Mateo, CA, Jan. 1, 1989.

International Search Report and Written Opinion, PCT/US2011/052262, dated Jan. 3, 2012, 13 pages.

Microsoft Corporation, "Fundamentals of Garbage Collection", Retrieved Aug. 30, 2013 via the WayBack Machine, 11 pages.

Microsoft Corporation, "GCSettings.IsServerGC Property", Retrieved Oct. 27, 2013 via the WayBack Machine, 3 pages.

Storer et al.; "Pergamum: Replacing Tape with Energy Efficient, Reliable, Disk-Based Archival Storage", 6th USENIX Conference on File and Storage Technologies (FAST '08) Feb. 26-29, 2008, USENIX Berkeley, CA.

* cited by examiner

State Table 522

- Device Age 602
- Error Rate 604
- Total Errors 606
- Number of Recoverable Errors 608
- Number of Unrecoverable Errors 610
- Access Rate 612
- Data Age 614
- Allocation State of a First Allocation Space 616a
- ...
- Allocation State of an nth Allocation Space 616n

*FIG. 6*

DATA PROTECTION USING INTRA-DEVICE PARITY AND INTRA-DEVICE PARITY

CROSS-REFERENCE TO RELATED APPLICATIONS

This application is a continuation application of and claims priority from U.S. Pat. No. 10,817,375, issued Oct. 27, 2020, which is a continuation application of and claims priority from U.S. Pat. No. 10,810,083, issued Oct. 20, 2020, which is a continuation application of and claims priority from U.S. Pat. No. 10,180,879, issued Jan. 15, 2019, which is a continuation application of and claims priority from U.S. Pat. No. 9,244,769, issued Jan. 26, 2016.

BACKGROUND OF THE INVENTION

Field of the Invention

This invention relates to computer networks and, more particularly, to efficiently distributing data among a plurality of solid-state storage devices.

Description of the Related Art

As computer memory storage and data bandwidth increase, so does the amount and complexity of data that businesses daily manage. Large-scale distributed storage systems, such as data centers, typically run many business operations. A distributed storage system may be coupled to client computers interconnected by one or more networks. If any portion of the distributed storage system has poor performance or becomes unavailable, company operations may be impaired or stopped completely. A distributed storage system therefore is expected to maintain high standards for data availability and high-performance functionality. As used herein, storage disks may be referred to as storage devices as some types of storage technologies do not include disks.

To protect against data loss, storage devices often include error detection and correction mechanisms. Often these mechanisms take the form of error correcting codes which are generated by the devices and stored within the devices themselves. In addition, distributed storage systems may also utilize decentralized algorithms to distribute data among a collection of storage devices. These algorithms generally map data objects to storage devices without relying on a central directory. Examples of such algorithms include Replication Under Scalable Hashing (RUSH), and Controlled Replication Under Scalable Hashing (CRUSH). With no central directory, multiple clients in a distributed storage system may simultaneously access data objects on multiple servers. In addition, the amount of stored metadata may be reduced. However, the difficult task remains of distributing data among multiple storage disks with varying capacities, input/output (I/O) characteristics and reliability issues. Similar to the storage devices themselves, these algorithms may also include error detection and correction algorithms such as RAID type algorithms (e.g., RAID5 and RAID6) or Reed-Solomon codes.

The technology and mechanisms associated with chosen storage devices determine the methods used to distribute data among multiple storage devices, which may be dynamically added and removed. For example, the algorithms described above were developed for systems utilizing hard disk drives (HDDs). The HDDs comprise one or more rotating disks, each coated with a magnetic medium. These disks rotate at a rate of several thousand rotations per minute for several hours daily. In addition, a magnetic actuator is responsible for positioning magnetic read/write devices over the rotating disks. These actuators are subject to friction, wear, vibrations and mechanical misalignments, which result in reliability issues. The above-described data distribution algorithms are based upon the characteristics and behaviors of HDDs.

One example of another type of storage disk is a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may comprise banks of Flash memory. Without moving parts or mechanical delays, an SSD may have a lower access time and latency than a HDD. However, SSD typically have significant write latencies. In addition to different input/output (I/O) characteristics, an SSD experiences different failure modes than a HDD. Accordingly, high performance and high reliability may not be achieved in systems comprising SSDs for storage while utilizing distributed data placement algorithms developed for HDDs.

In view of the above, systems and methods for efficiently distributing data and detecting and correcting errors among a plurality of solid-state storage devices are desired.

SUMMARY OF THE INVENTION

Various embodiments of a computer system and methods for efficiently distributing and managing data among a plurality of solid-state storage devices are disclosed.

In one embodiment, a computer system comprises a plurality of client computers configured to convey read and write requests over a network to one or more data storage arrays coupled to receive the read and write requests via the network. Contemplated is a data storage array(s) comprising a plurality of storage locations on a plurality of storage devices. In various embodiments, the storage devices are configured in a redundant array of independent drives (RAID) arrangement for data storage and protection. The data storage devices may include solid-state memory technology for data storage, such as Flash memory cells. The data storage subsystem further comprises a storage controller configured to store user data in a first page of a first storage device of the plurality of storage devices; generate intra-device protection data corresponding to the user data, and store the intra-device protection data at a first offset within the first page. The controller is further configured to generate inter-device protection data corresponding to the first page, and store the inter-device protection data at a second offset within a second page in a second storage device of the plurality of storage devices, wherein the first offset is different from the second offset.

In various embodiments, the protection data in the first page is a checksum value computed from corresponding data stored in the first page of the first storage device. Additionally, the second storage device further stores intra-device protection data for the second page in the second storage device.

Also contemplated are embodiments wherein the first storage device is formatted to a power of 2 sector size such that the first page is aligned to a power of 2 boundary, and wherein the data in the first page is compressed by the controller in order to accommodate storage of the intra-device protection data within the first page. Further, the intra-device protection data in the first page further includes one or both of a physical address or a virtual address corresponding to the user data stored within the first page which may be used during a read operation to validate the read data.

These and other embodiments will become apparent upon consideration of the following description and accompanying drawings.

BRIEF DESCRIPTION OF THE DRAWINGS

FIG. 6 is a generalized block diagram illustrating one embodiment of a state table.

Figure 1:
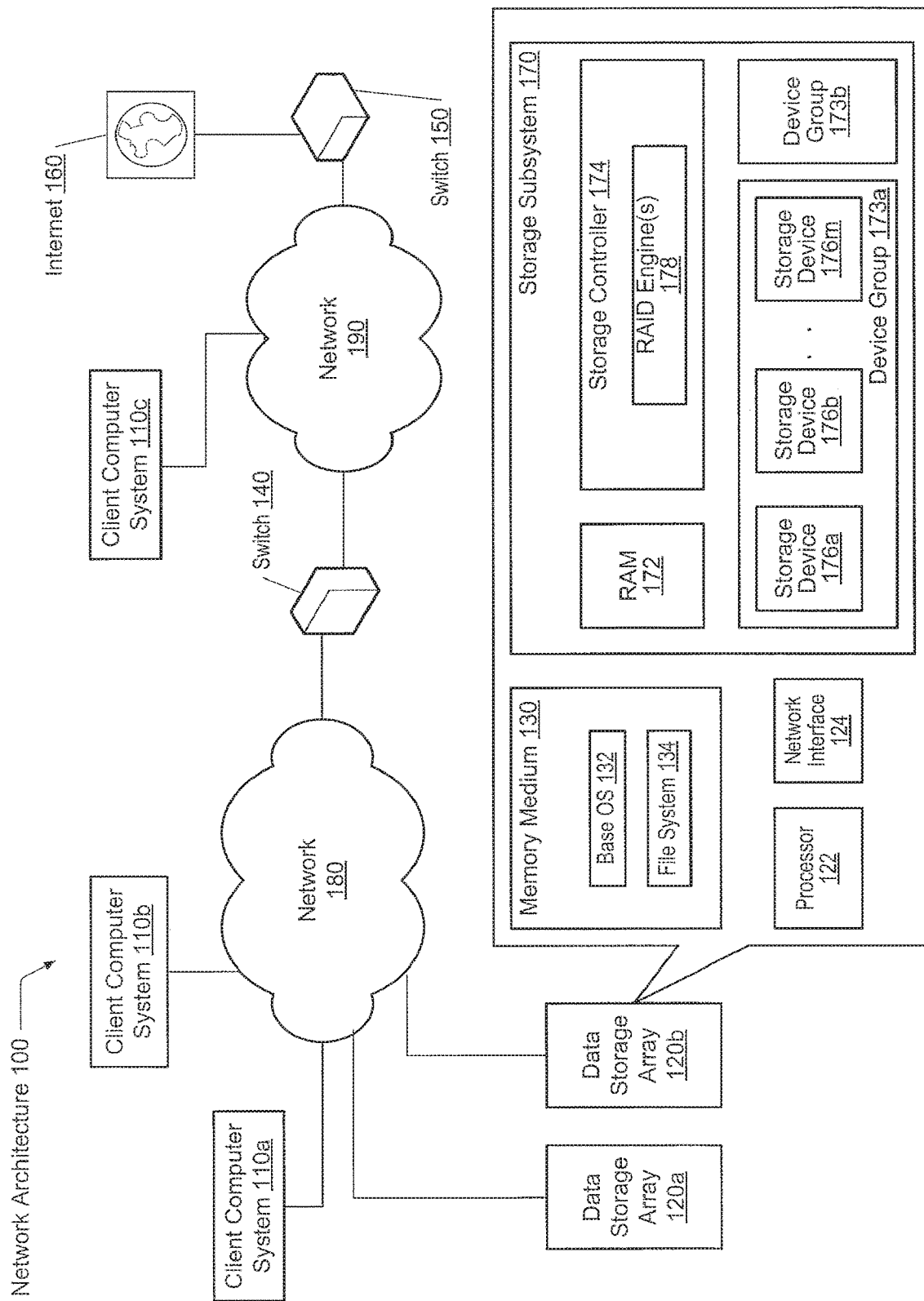
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or other outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. A further description of each of the components shown in FIG. 1 is provided shortly. First, an overview of some of the features provided by the data storage arrays 120a-120b is described.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. One or more nodes linked to one another form a cluster, which may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks). However, the storage devices 176a-176m may not comprise a disk. In one embodiment, each of the storage devices 176a-176m may utilize technology for data storage that is different from a conventional hard disk drive (HDD). For example, one or more of the storage devices 176a-176m may include or be further coupled to storage consisting of solid-state memory to store persistent data. In other embodiments, one or more of the storage devices 176a-176m may include or be further coupled to storage utilizing spin torque transfer technique, magnetoresistive random access memory (MRAM) technique, or other storage techniques. These different storage techniques may lead to differing reliability characteristics between storage devices.

The type of technology and mechanism used within each of the storage devices 176a-176m may determine the algorithms used for data object mapping and error detection and correction. The logic used in these algorithms may be included within one or more of a base operating system (OS) 116, a file system 140, one or more global RAID engines 178 within a storage subsystem controller 174, and control logic within each of the storage devices 176a-176m.

In one embodiment, the included solid-state memory comprises solid-state drive (SSD) technology. Typically, SSD technology utilizes Flash memory cells. As is well known in the art, a Flash memory cell holds a binary value based on a range of electrons trapped and stored in a floating gate. A fully erased Flash memory cell stores no or a minimal number of electrons in the floating gate. A particular binary value, such as binary 1 for single-level cell (SLC) Flash, is associated with an erased Flash memory cell. A multi-level cell (MLC) Flash has a binary value 11 associated with an erased Flash memory cell. After applying a voltage higher than a given threshold voltage to a controlling gate within a Flash memory cell, the Flash memory cell traps a given range of electrons in the floating gate. Accordingly, another particular binary value, such as binary 0 for SLC Flash, is associated with the programmed (written) Flash memory cell. A MLC Flash cell may have one of multiple binary values associated with the programmed memory cell depending on the applied voltage to the control gate.

Generally speaking, SSD technologies provide lower read access latency times than HDD technologies. However, the write performance of SSDs is significantly impacted by the availability of free, programmable blocks within the SSD. As the write performance of SSDs is significantly slower compared to the read performance of SSDs, problems may occur with certain functions or operations expecting similar latencies. In addition, the differences in technology and mechanisms between HDD technology and SDD technology lead to differences in reliability characteristics of the data storage devices 176a-176m.

In various embodiments, a Flash cell within an SSD must generally be erased before it is written with new data. Additionally, an erase operation in various flash technologies must also be performed on a block-wise basis. Consequently, all of the Flash memory cells within a block (an erase segment or erase block) are erased together. A Flash erase block may comprise multiple pages. For example, a page may be 4 kilobytes (KB) in size and a block may include 64 pages, or 256 KB. Compared to read operations in a Flash device, an erase operation may have a relatively high latency—which may in turn increase the latency of a corresponding write operation. Programming or reading of Flash technologies may be performed at a lower level of granularity than the erase block size. For example, Flash cells may be programmed or read at a byte, word, or other size.

A Flash cell experiences wear after repetitive erase-and-program operations. The wear in this case is due to electric charges that are injected and trapped in the dielectric oxide layer between the substrate and the floating gate of the MLC Flash cell. In one example, a MLC Flash cell may have a limit of a number of times it experiences an erase-and-program operation, such as a range from 10,000 to 100,000 cycles. In addition, SSDs may experience program disturb errors that cause a neighboring or nearby Flash cell to experience an accidental state change while another Flash cell is being erased or programmed. Further, SSDs include read disturb errors, wherein the accidental state change of a nearby Flash cell occurs when another Flash cell is being read.

Knowing the characteristics of each of the one or more storage devices 176a-176m may lead to more efficient data object mapping and error detection and correction. In one embodiment, the global RAID engine 178 within the storage controller 174 may detect for the storage devices 176a-176m at least one or more of the following: inconsistent response times for I/O requests, incorrect data for corresponding accesses, error rates and access rates. In response to at least these characteristics, the global RAID engine 178 may determine which RAID data layout architecture to utilize for a corresponding group of storage devices within storage devices 176a-176m. In addition, the global RAID engine 178 may dynamically change both an intra-device redundancy scheme and an inter-device RAID data layout based on the characteristics of the storage devices 176a-176m.

FIG. 1 illustrates an example of a system capable of the described features according to one embodiment. Further details are provided below. Referring to FIG. 1, a further description of the components of network architecture 100 is provided below.

Components of a Network Architecture

Again, as shown, network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, storage area networks (SANs), wide area network (WAN) connections such as the Internet, a router, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Ethernet, Fibre Channel, Fibre Channel over Ethernet (FCoE), iSCSI, and so forth may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), workstations, laptops, handheld computers, servers, server farms, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be in turn connected to a network interface. In addition to hardware components, each of the client computer systems 110a-110c may include a base operating system (OS) stored within the memory hierarchy. The base OS may be representative of any of a variety of specific operating systems, such as, for example, MS-DOS®, MS-WINDOWS®, OS/2®, UNIX®, Linux®, Solaris® or another known operating system. As such, the base OS may be operable to provide various services to the end-user and provide a software framework operable to support the execution of various programs. Additionally, each of the client computer systems 110a-110c may include a hypervisor used to support higher-level virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources, such logical storage entities (e.g., logical unit numbers, LUNs) corresponding to the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be a SSD. A controller 174 may comprise logic for handling received read/write requests. For example, the algorithms briefly described above may be executed in at least controller 174. A random-access memory (RAM) 172 may be used to batch operations, such as received write requests.

The base OS 132, the file system 134, any OS drivers (not shown) and other software stored in memory medium 130 may provide functionality enabling access to files and LUNs, and the management of these functionalities. The base OS 134 and the OS drivers may comprise program instructions stored on the memory medium 130 and executable by processor 122 to perform one or more memory access operations in storage subsystem 170 that correspond to received requests.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In one embodiment, a data storage model may be developed which seeks to optimize data layouts for both user data and corresponding error correction code (ECC) information. In one embodiment, the model is based at least in part on characteristics of the storage devices within a storage system. For example, in a storage system, which utilizes solid-state storage technologies, characteristics of the particular devices may be used to develop a model for the storage system and may also serve to inform corresponding data storage arrangement algorithms. For example, if particular storage devices being used exhibit a change in reliability over time, such a characteristic may be accounted for in dynamically changing a data storage arrangement. As used herein, characteristics of a device may refer to characteristics of the device as a whole, characteristics of a sub-portion of a device such as a chip or other component, characteristics of an erase block, or any other characteristics related to the device.

Generally speaking, any model which is developed for a computing system is incomplete. Often, there are simply too many variables to account for in a real world system to completely model a given system. In some cases, it may be possible to develop models which are not complete but which are nevertheless valuable. As discussed more fully below, embodiments are described wherein a storage system is modeled based upon characteristics of the underlying devices. In various embodiments, selecting a data storage arrangement is performed based on certain predictions as to how the system may behave. Based upon an understanding of the characteristics of the devices, certain device behaviors are more predictable than others. However, device behaviors may change over time, and in response, a selected data layout may also be changed.

Intra-Device Redundancy

Figure 2:
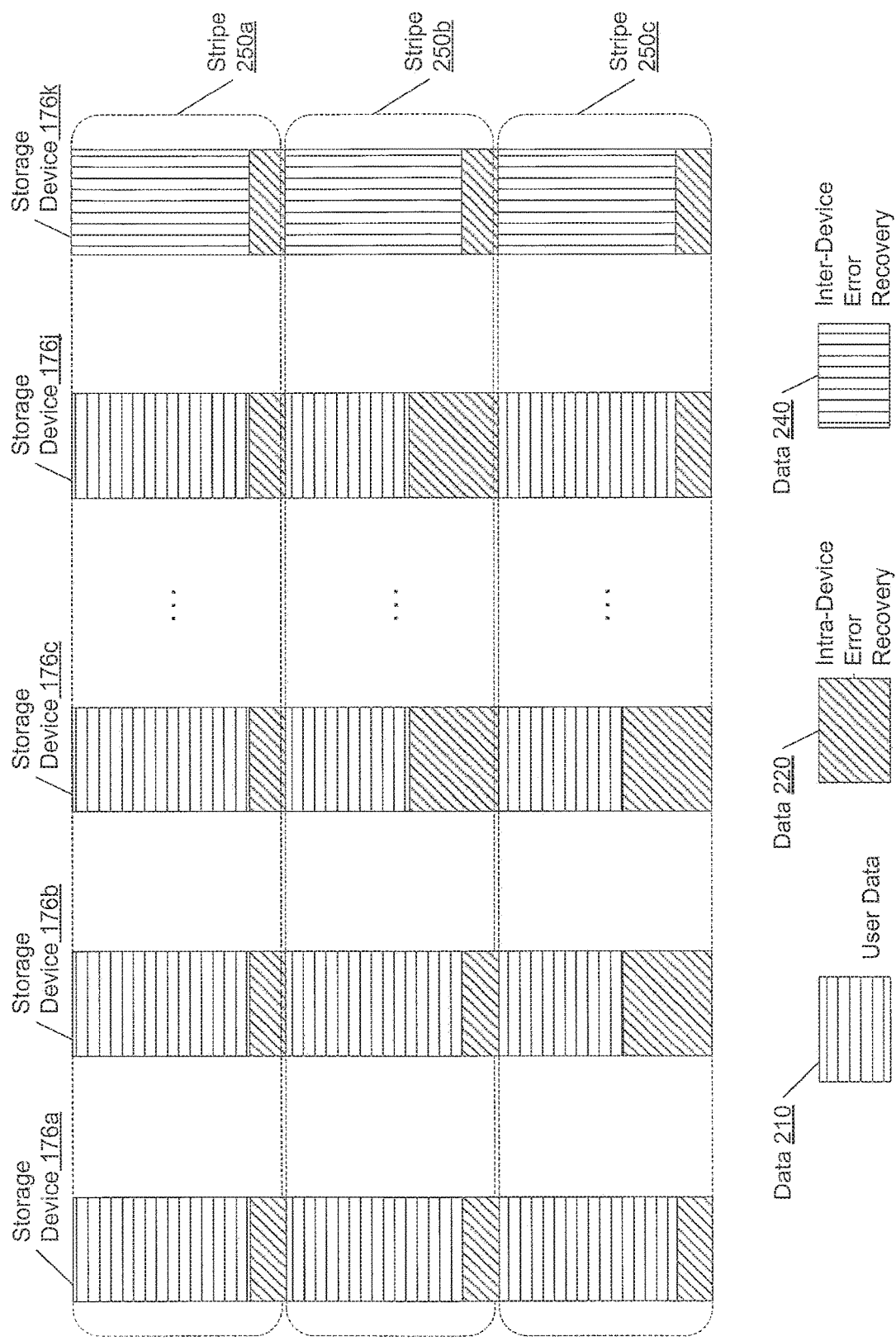
FIG. 2 is a generalized block diagram of one embodiment of a dynamic intra-device redundancy scheme.

Turning now to FIG. 2, a generalized block diagram illustrating one embodiment of a dynamic intra-device redundancy scheme is shown. As is well known to those skilled in the art, one of several intra-device redundancy schemes may be chosen to reduce the effects of latent sector errors in a storage device. The term "sector" typically refers to a basic unit of storage on a HDD, such as a segment within a given track on the disk. Here, the term "sector" may also refer to a basic unit of allocation on a SSD.

An allocation unit within an SSD may include one or more erase blocks within an SSD. Referring to FIG. 2, the user data 210 may refer to both stored data to be modified and accessed by end-users and inter-device error-correction code (ECC) data. The inter-device ECC data may be parity information generated from one or more pages on other storage devices holding user data. For example, the inter-device ECC data may be parity information used in a RAID data layout architecture. The user data 210 may be stored within one or more pages included within one or more of the storage devices 176a-176k. In one embodiment, each of the storage devices 176a-176k is an SSD.

An erase block within an SSD may comprise several pages. As described earlier, in one embodiment, a page may include 4 KB of data storage space. An erase block may include 64 pages, or 256 KB. In other embodiments, an erase block may be as large as 1 megabyte (MB), and include 256 pages. An allocation unit size may be chosen in a manner to provide both sufficiently large sized units and a relatively low number of units to reduce overhead tracking of the allocation units. In one embodiment, one or more state tables may maintain a state of an allocation unit (allocated, free, erased, error), a wear level, and a count of a number of errors (correctable and/or uncorrectable) that have occurred within the allocation unit. In various embodiments, the size of an allocation unit may be selected to balance the number of allocation units available for a give device against the overhead of maintaining the allocation units. For example, in one embodiment the size of an allocation unit may be selected to be approximately 1/100th of one percent of the total storage capacity of an SSD. Other amounts of data storage space for pages, erase blocks and other unit arrangements are possible and contemplated.

Latent sector errors (LSEs) occur when a given sector or other storage unit within a storage device is inaccessible. A read or write operation may not be able to complete for the given sector. In addition, there may be an uncorrectable error-correction code (ECC) error. An LSE is an error that is undetected until the given sector is accessed. Therefore, any data previously stored in the given sector may be lost. A single LSE may lead to data loss when encountered during RAID reconstruction after a storage device failure. For an SSD, an increase in the probability of an occurrence of another LSE may result from at least one of the following statistics: device age, device size, access rates, storage compactness and the occurrence of previous correctable and uncorrectable errors. To protect against LSEs and data loss within a given storage device, one of a multiple of intra-device redundancy schemes may be used within the given storage device.

An intra-device redundancy scheme utilizes ECC information, such as parity information, within the given storage device. This intra-device redundancy scheme and its ECC information corresponds to a given device and may be maintained within a given device, but is distinct from ECC that may be internally generated and maintained by the device itself. Generally speaking, the internally generated and maintained ECC of the device is invisible to the system within which the device is included. The intra-device ECC information included within the given storage device may be used to increase data storage reliability within the given storage device. This intra-device ECC information is in addition to other ECC information that may be included within another storage device such as parity information utilized in a RAID data layout architecture.

A highly effective intra-device redundancy scheme may sufficiently enhance a reliability of a given RAID data layout to cause a reduction in a number of devices used to hold parity information. For example, a double parity RAID layout may be replaced with a single parity RAID layout if there is additional intra-device redundancy to protect the data on each device. For a fixed degree of storage efficiency, increasing the redundancy in an intra-device redundancy scheme increases the reliability of the given storage device. However, increasing the redundancy in such a manner may also increase a penalty on the input/output (I/O) performance of the given storage device.

In one embodiment, an intra-device redundancy scheme divides a device into groups of locations for storage of user data. For example, a division may be a group of locations within a device that correspond to a stripe within a RAID layout as shown by stripes 250a-250c. User data or inter-device RAID redundancy information may be stored in one or more pages within each of the storage devices 176a-176k as shown by data 210. Within each storage device, intra-device error recovery data 220 may be stored in one or more pages. As used herein, the intra-device error recovery data 220 may be referred to as intra-device redundancy data 220. As is well known by those skilled in the art, the intra-device redundancy data 220 may be obtained by performing a function on chosen bits of information within the data 210. An XOR-based operation may be used to derive parity information to store in the intra-device redundancy data 220. Other examples of intra-device redundancy schemes include single parity check (SPC), maximum distance separable (MDS) erasure codes, interleaved parity check codes (IPC), hybrid SPC and MDS code (MDS+SPC), and column diagonal parity (CDP). The schemes vary in terms of delivered reliability and overhead depending on the manner the data 220 is computed. In addition to the above described redundancy information, the system may be configured to calculate a checksum value for a region on the device. For example, a checksum may be calculated when information is written to the device. This checksum is stored by the system. When the information is read back from the device, the system may calculate the checksum again and compare it to the value that was stored originally. If the two checksums differ, the information was not read properly, and the system may use other schemes to recover the data. Examples of checksum functions include cyclical redundancy check (CRC), MD5, and SHA-1. Further, in various embodiments, checksums may be "salted" with a virtual and or physical address corresponding to data by using the address as part of the checksum calculation.

As shown in stripes 250a-250c, the width, or number of pages, used to store the data 210 within a given stripe may be the same in each of the storage devices 176a-176k. However, as shown in stripes 250b-250c, the width, or number of pages, used to store the intra-device redundancy data 220 within a given stripe may not be the same in each of the storage devices 176a-176k. In one embodiment, changing characteristics or behaviors of a given storage device may determine, at least in part, the width used to store corresponding intra-device redundancy data 220. For example, as described above, Flash cells experience program disturb errors and read disturb errors, wherein programming or reading a page may disturb nearby pages and cause errors within these nearby pages. When a storage device is aging and producing more errors, the amount of corresponding intra-device redundancy data 220 may increase. For example, prior to a write operation for stripe 250b, characteristics of each of the storage devices 176a-176k may be monitored and used to predict an increasing error rate. A predicted increase in errors for storage devices 176c and 176j may be detected. In response, the amount of intra-device redundancy data 220 may be increased for storage devices 176c and 176j. In the example of stripes 250a and 250b of FIG. 2, an increase in the amount of protection data stored can be seen for storage devices 176c and 176j for stripes 250a and 250b. For example, now, rather than protecting storage devices 176c and 176j with single parity, these devices may be protected with double parity or triple parity. It is noted that increasing the amount of intra-device protection for devices 176c and 176j does not necessitate a corresponding increase in other devices of the same stripe. Rather, data for the stripe may have differing levels of protection in each device as desired.

In various embodiments, increases or decreases in a given level of data protection may occur on a selective basis. For example, in one embodiment, an increase in protection may occur only for storage devices that are detected to generate more errors, such as storage devices 176c and 176j in the above example. In another embodiment, an increase in protection may occur for each of the storage devices 176a-176k when storage devices 176c and 176j are detected to generate more errors. In one embodiment, increasing the amount of intra-device protection on a parity device such as device 176k may require a reduction in the amount of data protected within the stripe. For example, increasing the amount of intra-device data stored on a parity device for a given stripe will necessarily reduce an amount of parity data stored by that device for data within the stripe. If this amount of parity data is reduced to an amount that is less than that needed to protect all of the data in the stripe, then data within the stripe must be reduced if continued parity protection is desired. As an alternative to reducing an amount of data stored within the stripe, a different device could be selected for storing the parity data. Various options are possible and are contemplated. It is also noted that while FIG. 2 and other figures described herein may depict a distinct parity device (e.g., 176k), in various embodiments the parity may be distributed across multiple devices rather than stored in a single device. Accordingly, the depiction of a separate parity device in the figures may generally be considered a logical depiction for ease of discussion.

Figure 3:
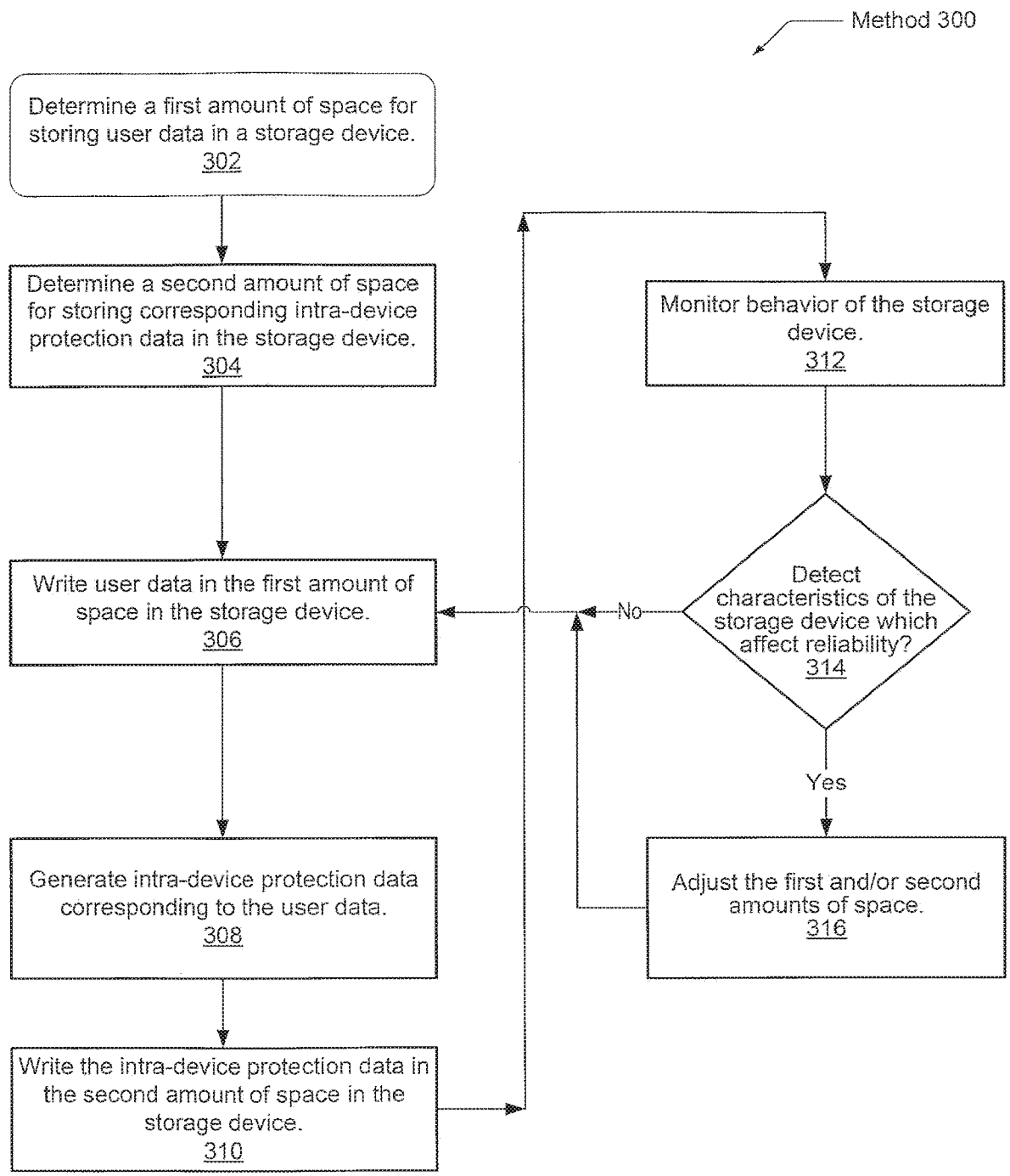
FIG. 3 is a generalized flow diagram illustrating one embodiment of a method for adjusting intra-device protection in a data storage subsystem.

Referring now to FIG. 3, one embodiment of a method 300 for adjusting intra-device protection in a data storage subsystem is shown. The components embodied in network architecture 100 and data storage arrays 120a-120b described above may generally operate in accordance with method 300. The steps in this embodiment are shown in sequential order. However, some steps may occur in a different order than shown, some steps may be performed concurrently, some steps may be combined with other steps, and some steps may be absent in another embodiment.

In block 302, a first amount of space for storing user data in a storage device is determined. This user data may be data used in end-user applications or inter-device parity information used in a RAID architecture as described earlier regarding data 210. This first amount of space may comprise one or more pages within a storage device as described earlier. In one embodiment, a global RAID engine 178 within the storage controller 174 receives behavioral statistics from each one of the storage devices 176a-176m. For a given device group comprising two or more of the storage devices 176a-176m, the global RAID engine 178 may determine both a RAID data layout and an initial amount of intra-device redundancy to maintain within each of the two or more storage devices. In block 304, the RAID engine 178 may determine a second amount of space for storing corresponding intra-device protection data in a storage device. This second amount of space may comprise one or more pages within a storage device. The intra-device protection data may correspond to the to intra-device redundancy data 220 described earlier.

In block 306, data is written in the first amount of space within each storage device included within a given device group. In one embodiment, both user data and inter-device parity information is written as a single RAID stripe across multiple storage devices included within the given device group. Referring again to FIG. 2, the width for the corresponding data being written is the same within each storage device. In block 308, the intra-device protection data is generated by an ECC algorithm, an XOR-based algorithm, or any other suitable algorithm. In addition, the system may generate a checksum to help identify data that has not been retrieved properly. In block 310, the generated intra-device protection data is written in the second amount of space in the storage devices.

In block 312, the RAID engine 178 may monitor behavior of the one or more storage devices. In one embodiment, the RAID engine 178 may include a model of a corresponding storage device and receive behavioral statistics from the storage device to input to the model. The model may predict behavior of the storage device by utilizing known characteristics of the storage device. For example, the model may predict an upcoming increasing error rate for a given storage device. If the RAID engine 178 detects characteristics of a given storage device which affect reliability (conditional block 314), then in block 316, the RAID engine may adjust the first amount and the second amount of space for storing data and corresponding intra-device redundancy data. For example, the RAID engine may be monitoring the statistics described earlier such as at least device age, access rate and error rate. Referring again to FIG. 2, the RAID engine 178 may detect storage devices 176c and 176j have an increase in a number of errors. Alternatively, the RAID engine may predict an increase in a number of errors for storage devices 176c and 176j. Accordingly, prior to writing the second stripe 250b, the RAID engine 178 may adjust a number of pages used to store data 210 and data 220 in each of the storage devices 176a-176k. Similarly, the RAID engine 178 may detect storage device 176b has decreased reliability. Therefore, prior to writing the third stripe 250c, the RAID engine 178 may again adjust a number of pages used to store data 210 and data 220 in each of the storage devices 176a-176k.

Monitoring Storage Device Characteristics

Figure 4:
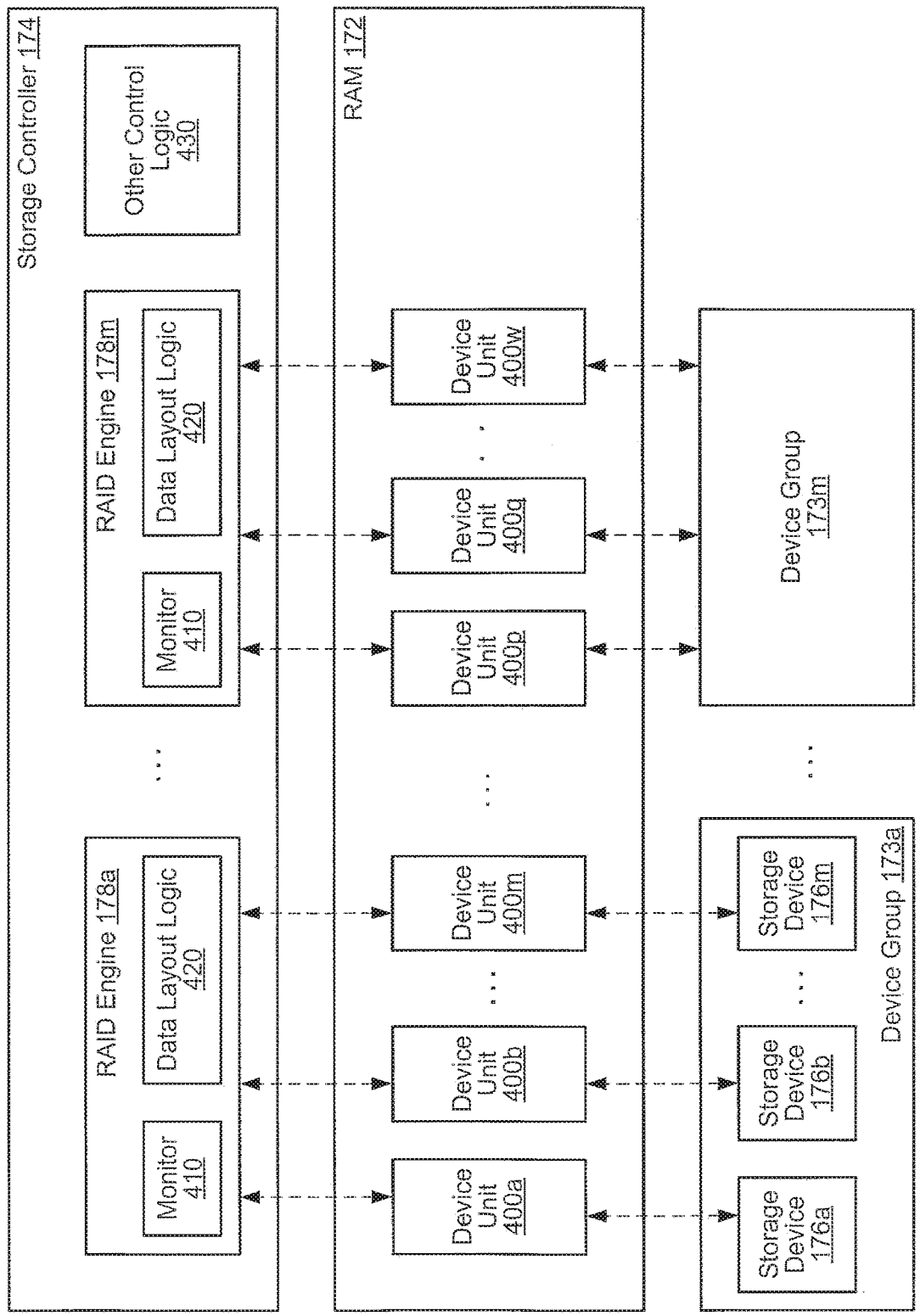
FIG. 4 is a generalized block diagram of one embodiment of a storage subsystem.

Turning now to FIG. 4, a generalized block diagram of one embodiment of a storage subsystem is shown. Each of the one or more storage devices 176a-176m may be partitioned in one of one or more device groups 173a-173m. Other device groups with other devices may be present as well. One or more corresponding operation queues and status tables for each storage device may be included in one of the device units 400a-400w. These device units may be stored in RAM 172. A corresponding RAID engine 178a-178m may be included for each one of the device groups 173a-173m. Each RAID engine 178 may include a monitor 410 that tracks statistics for each of the storage devices included within a corresponding device group. Data layout logic 420 may determine an amount of space to allocate within a corresponding storage device for user data, inter-device redundancy data and intra-device redundancy data. The storage controller 174 may comprise other control logic 430 to perform at least one of the following tasks: wear leveling, garbage collection, I/O scheduling, deduplication and protocol conversion for incoming and outgoing packets.

Figure 5:
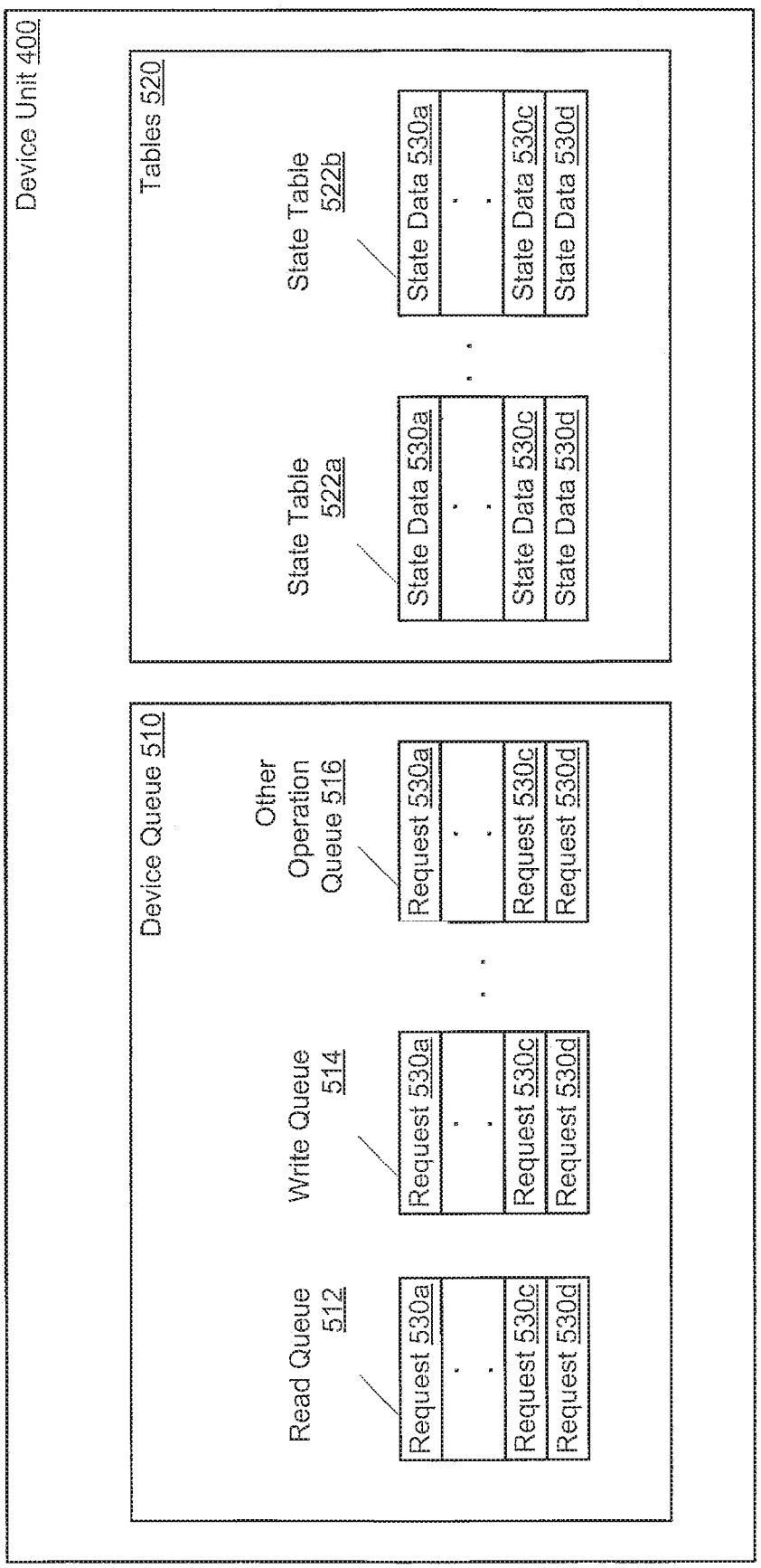
FIG. 5 is a generalized block diagram of one embodiment of a device unit.

Turning now to FIG. 5, a generalized block diagram of one embodiment of a device unit is shown. A device unit may comprise a device queue 510 and tables 520. Device queue 510 may include a read queue 512, a write queue 514 and one or more other queues such as other operation queue 516. Each queue may comprise a plurality of entries for storing one or more corresponding requests 530a-530d. For example, a device unit for a corresponding SSD may include queues to store at least read requests, write requests, trim requests, erase requests and so forth. Tables 520 may comprise one or more state tables 522a-522b, each comprising a plurality of entries for storing state data, or statistics, 530. It is also noted that while the queues and tables are shown to include a particular number of entries in this and other figures, the entries themselves do not necessarily correspond to one another. Additionally, the number of queues, tables, and entries may vary from that shown in the figure and may differ from one another.

Referring now to FIG. 6, a generalized block diagram illustrating one embodiment of a state table corresponding to a given device is shown. In one embodiment, such a table may include data corresponding to state, error and wear level information for a given storage device, such as an SSD. A corresponding RAID engine may have access to this information, which may allow the RAID engine to dynamically change space allocated for data storage and schemes used for both inter-device protection and intra-device protection. In one embodiment, the information may include at least one or more of a device age 602, an error rate 604, a total number of errors detected on the device 606, a number of recoverable errors 608, a number of unrecoverable errors 610, an access rate of the device 612, an age of the data stored 614 and one or more allocation states for allocation spaces 616a-616n. The allocation states may include filled, empty, error and so forth.

Flexible RAID Layout

Figure 7:
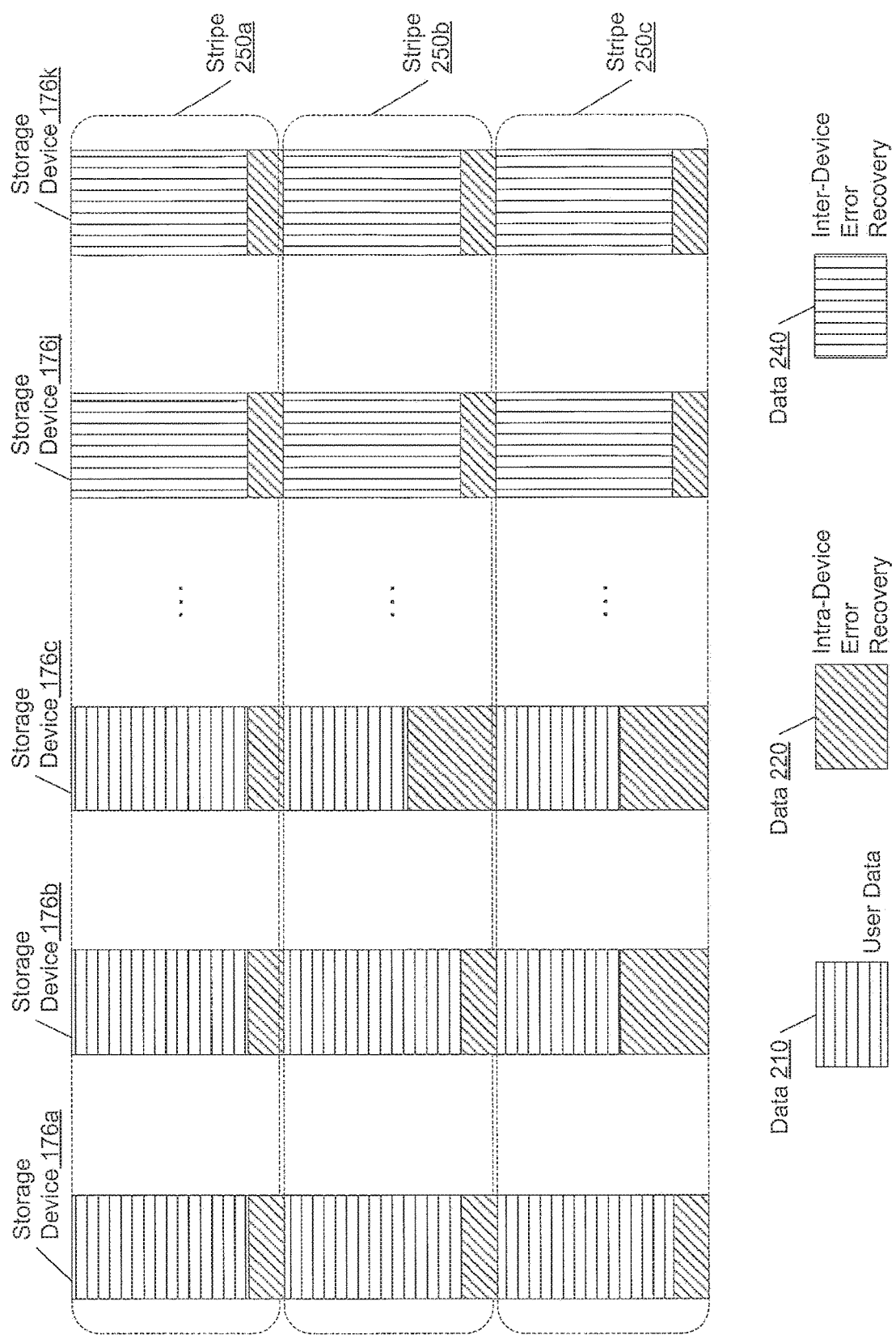
FIG. 7 is a generalized block diagram illustrating one embodiment of a flexible RAID data layout architecture.

Turning now to FIG. 7, a generalized block diagram illustrating one embodiment of a flexible RAID data layout architecture is shown. A RAID engine may determine a level of protection to use for storage devices 176a-176k. For example, a RAID engine may determine to utilize RAID double parity for the storage devices 176a-176k. The inter-device redundancy data 240 may represent the RAID double parity values generated from corresponding user data. In one embodiment, storage devices 176j and 176k may store the double parity information. It is understood other levels of RAID parity protection are possible and contemplated. In addition, in other embodiments, the storage of the double parity information may rotate between the storage devices rather than be stored within storage devices 176j and 176k for each RAID stripe. The storage of the double parity information is shown to be stored in storage devices 176j and 176k for ease of illustration and description.

Figure 8:
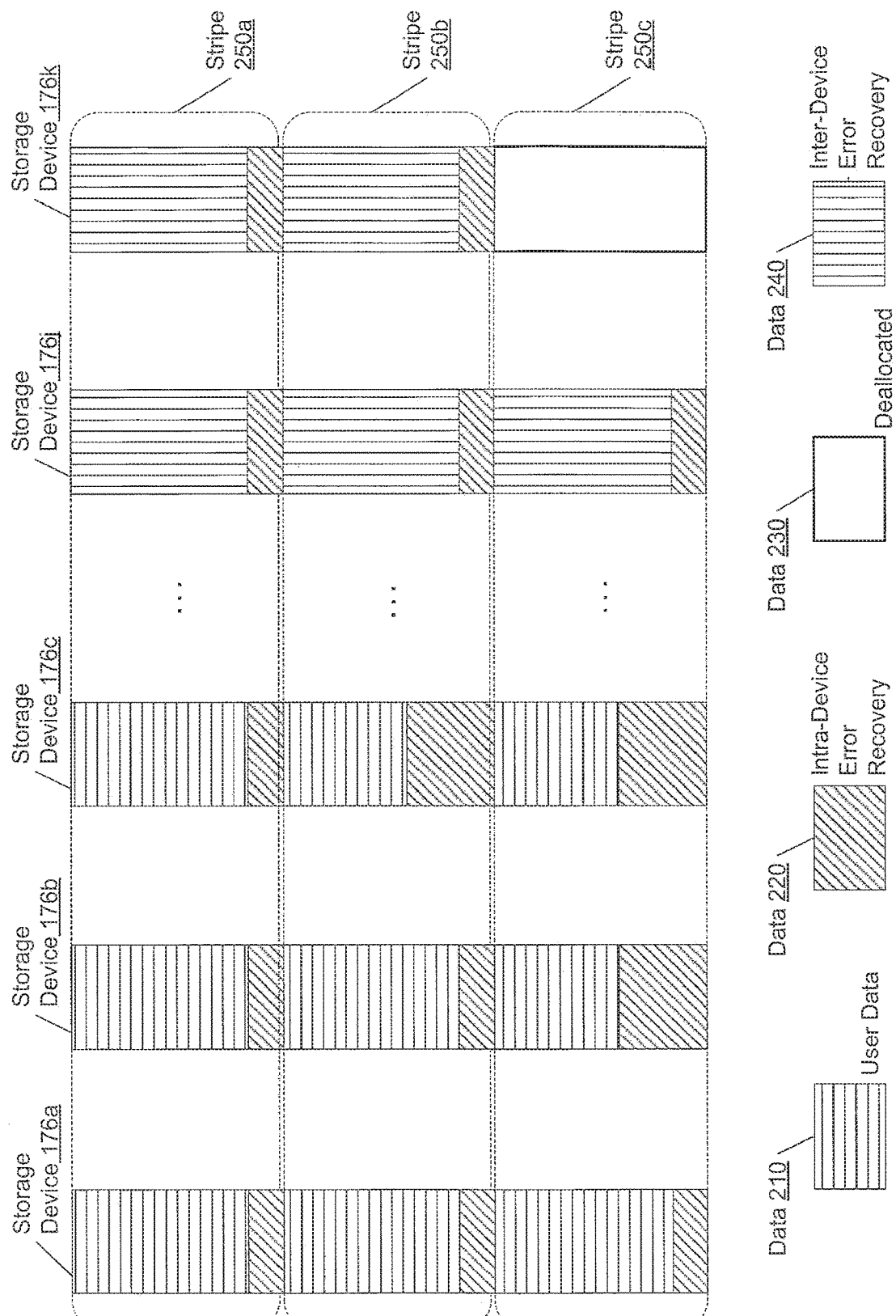
FIG. 8 is a generalized block diagram illustrating another embodiment of a flexible RAID data layout architecture.

Referring now to FIG. 8, a generalized block diagram illustrating another embodiment of a flexible RAID data layout architecture is shown. Similar to the example shown in FIG. 7, double parity may be used for the storage devices 176a-176k. Although a RAID double parity is described in this example, any amount of redundancy in a RAID data layout architecture may be chosen.

During operation, the RAID engine 178 may monitor characteristics of the storage devices 176a-176k and determine the devices are exhibiting a reliability level higher than an initial or other given reliability level. In response, the RAID engine 178 may change the RAID protection from a RAID double parity to a RAID single parity. In other RAID data layout architectures, another reduction in the amount of supported redundancy may be used. In other embodiments, the monitoring of storage devices 176a-176k and changing a protection level may be performed by other logic within storage controller 174.

Continuing with the above example, only single parity information may be generated and stored for subsequent write operations executing on a given RAID stripe. For example, storage device 176k may not be used in subsequent RAID stripes for write operations after the change in the amount of supported redundancy. In addition, data stored in storage device 176k may be invalidated, thereby freeing the storage. Pages corresponding to freed data in storage device 176k may then be reallocated for other uses. The process of reducing an amount of parity protection and freeing space formerly used for storing parity protection data may be referred to as "parity shredding". In addition, in an embodiment wherein storage device 176k is an SSD, one or more erase operations may occur within storage device 176k prior to rewriting the pages within stripe 250a.

Continuing with the above example of parity shredding, the data stored in the reallocated pages of storage device 176k within stripe 250a after parity shredding may hold user data or corresponding RAID single parity information for other RAID stripes that do not correspond to stripe 250a. For example, the data stored in storage devices 176a-176j within stripe 250a may correspond to one or more write operations executed prior to parity shredding. The data stored in storage device 176k within stripe 250a may correspond to one or more write operations executed after parity shredding. Similarly, the data stored in storage devices 176a-176j within stripe 250b may correspond to one or more write operations executed prior to parity shredding. The pages in storage device 176k within stripe 250b may be freed, later erased, and later rewritten with data corresponding to one or more write operations executed after the change in the amount of supported redundancy. It is noted that this scheme may be even more effective when redundancy information is rotated across storage devices. In such an embodiment, space that is freed by shredding will likewise be distributed across the storage devices.

Referring again to FIG. 8, the deallocated pages shown in storage device 176k within stripe 250c represent storage locations that may have previously stored RAID double parity information prior to parity shredding. However, now these pages are invalid and have not yet been reallocated. Particular characteristics of an SSD determine the manner and the timing of both freeing and reallocating pages within storage device 176k in the above example. Examples of these characteristics include at least erasing an entire erase block prior to reprogramming (rewriting) one or more pages. As can be seen from FIG. 8, when parity is shredded, it is not necessary to shred an entire device. Rather, parity may be shredded for individual stripes as desired. Similarly, parity protection for a stripe may be increased may adding protection data stored on an additional device to a stripe.

Figure 9:
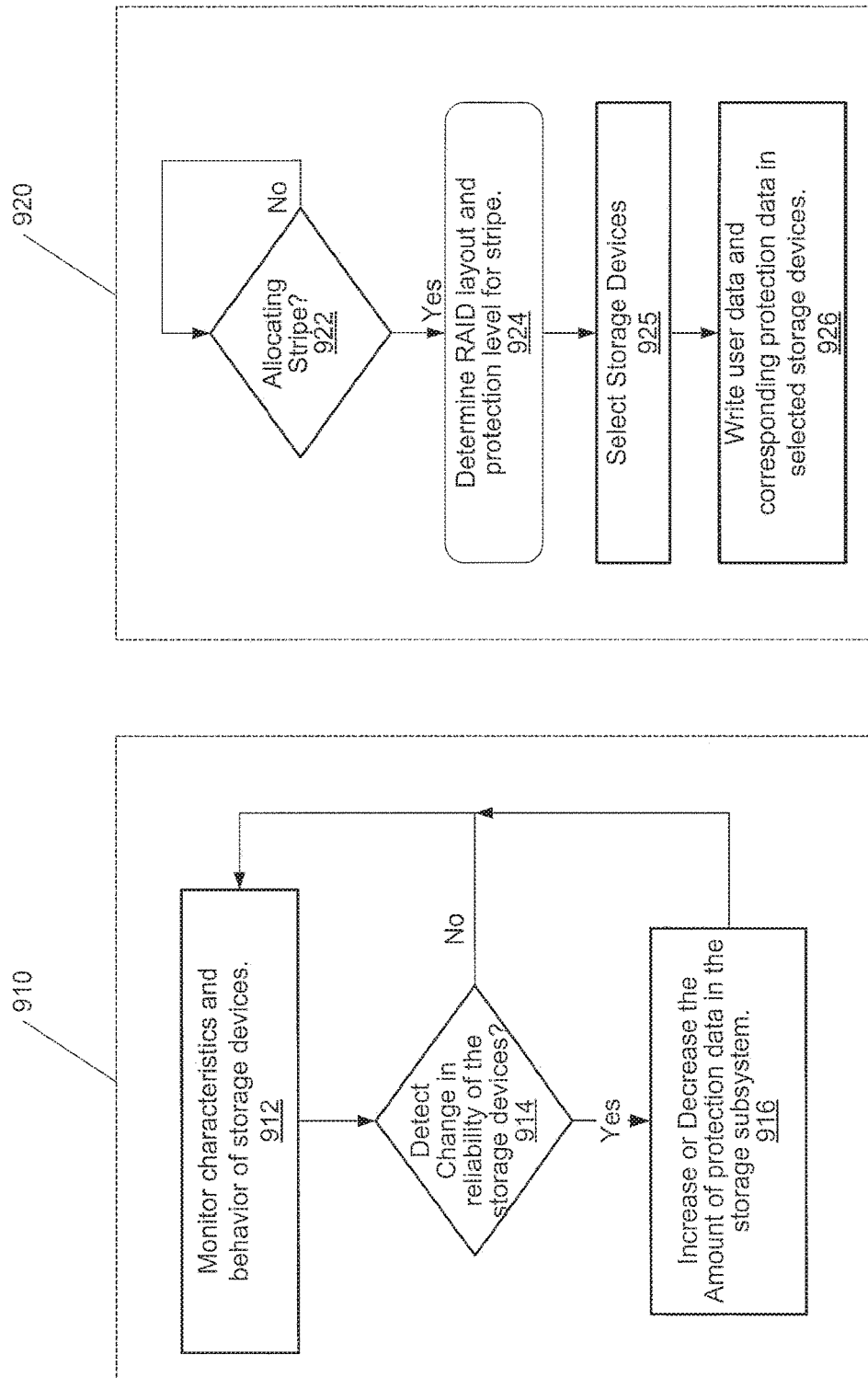
FIG. 9 is a generalized flow diagram illustrating one embodiment of a method for dynamically determining a layout in a data storage subsystem.

Referring now to FIG. 9, one embodiment of a method for dynamically determining a RAID layout is shown. The components embodied in network architecture 100 and data storage arrays 120a-120b described above may generally operate in accordance with method 900. In FIG. 9, two processes 910 and 920 are shown. Each of the processes may operate concurrently, or in a given order. Further, the steps in this embodiment are shown in sequential order. However, some steps may occur in a different order than shown, some steps may be performed concurrently, some steps may be combined with other steps, and some steps may be absent in another embodiment. Block 910 illustrates a process whereby a storage control system monitors the characteristics and behaviors of storage devices in the system (block 912). For example, characteristics such as those described in FIG. 6 may be observed and/or recorded. If a particular condition is detected, such as a change in reliability (decision block 914), then a change in the amount of protection used for stored data may be made (block 916). For example, when given devices are relatively young in age, the reliability of the devices may not be known (e.g., the devices may suffer "infant mortality" and fail at a relatively young age). Therefore, one or more extra storage devices per RAID stripe may be used to store parity information. At a later time, this extra protection may be removed when the devices prove over time that they are reliable. In various embodiments, characteristics regarding error rates may be maintained for devices. For example, characteristics concerning correctable and/or uncorrectable errors may be maintained and used to make decisions regarding the reliability of a given device. Based upon this information, the storage controller may dynamically alter various levels of protection for a device or stripe.

Block 920 of FIG. 9 generally illustrates a process whereby at the time a stripe or other portion of storage is to be allocated (decision block 922), a determination regarding the layout and protection level to use for the data may be made (block 924). It is noted that the process of block 910 could be performed at this time. Alternatively, levels of protection may have been determined by process 910 and stored. The determination of block 924 could then be based upon that stored data. In one embodiment, once a given layout has been determined, the particular devices to be used for the layout may be selected from a group of devices (block 925). For example, in one embodiment a group of 20 devices may be available for use. If a layout of 5+2 is determined, then any seven devices may be selected for use from the group of 20. Additionally, it is noted that a subsequent write with a selected 5+2 layout need not use the same 7 devices. Subsequent to determining the layout, protection level, and devices for the stripe, the stripe may be written (block 926).

In various embodiments, the RUSH algorithm may be utilized to determine which devices on which the data and redundancy information for a given stripe will reside. For example, the RUSH algorithm may be used to select the particular devices to utilize for an 8+2 RAID layout for a given stripe in storage devices 176a-176k. Generally speaking, as used herein, an M+N layout may generally describe a layout which includes M data devices and N parity devices for a given data stripe. Additionally, as discussed above, parity may be distributed across the devices rather than fully located within particular devices. Accordingly, an 8+2 layout may include data and parity striped across 10 devices— with 8 of the devices storing data and two of the devices storing parity. On a subsequent occasion, a layout of 12+2 may be selected. In this manner, the desired layout and protection characteristics may be determined dynamically at the time a write (e.g., a stripe) is to be written. In one embodiment, storage devices 176a-176k may include more than 10 storage devices, such as 30, 50 or more storage devices. However, for a stripe with an 8+2 layout, only 10 of the storage devices are utilized. It is noted that any 10 of the devices may be selected and any suitable algorithm may be used for selecting the 10 devices for use in storing the stripe. For example, the CRUSH algorithm could be used to select which 10 of the storage devices 176a-176k to utilize for a given 8+2 RAID layout.

In one example of a chosen 8+2 RAID layout for storage devices 176a-176k, 2 of the storage devices may be used to store error correcting code (ECC) information, such as parity information. This information may be used to perform reconstruct read requests. Referring again to FIG. 8, the storage devices 176j and 176k may be selected to store RAID double parity information in this example. Again, the parity information may be stored in a rotated fashion between each of the storage devices 176a-176k included within the RAID array, rather than consistently stored in the same storage devices. For ease of illustration and description, the storage devices 176j and 176k are described as storing RAID double parity.

In block 926, during execution of a write operation, metadata, user data, intra-device parity information and inter-device parity information may be written as a RAID stripe across multiple storage devices included within the RAID array. In block 912, the RAID engine 178 may monitor behavior of the one or more storage devices within the RAID array. In one embodiment, the RAID engine 178 may include a monitor 410 and data layout logic 420 as shown in FIG. 4. The RAID engine 178 may monitor at least an age of a given storage device, a number and a type of errors, detected configuration changes since a last allocation of data, an age of given data, a current usage of storage space in the RAID array, and so forth.

The data, which is monitored by the RAID engine 178, may be stored in RAM 172, such as in one of the device units 400a-400w shown in FIG. 4. Tables may be used to store this data, such as the examples shown in FIG. 5 and FIG. 6. The logic included within a corresponding RAID engine may both detect and predict behavior of storage devices by monitoring updated statistics of the storage devices. For example, the model may predict an upcoming increasing error rate for a given storage device.

If increased reliability of the storage device(s) is detected (conditional block 908), then in block 910, the RAID engine may decrease the level of data protection within the system. For example, in one embodiment the amount of parity information stored in the storage subsystem may be reduced. Regarding the above example, the RAID engine may decrease the RAID double parity to RAID single parity for the corresponding 8+2 RAID array, converting it to an 8+1 RAID array. In other examples a given RAID array may be utilizing an N-level amount of redundancy, or parity, in a RAID architecture prior to block 916. In block 916, the RAID engine may determine to utilize an (N-m)-level amount of redundancy, wherein N>1 and 1<m<N. Therefore, during subsequent write operations for a given RAID stripe, there will be m fewer storage devices written to within the given RAID stripe.

In order to reduce the level of data protection within the system, the RAID engine (or another component) may perform parity shredding as described earlier. Subsequently, the storage controller 174 may reallocate those pages which were freed as a result of the shredding operation to be used in subsequent write operations.

As each of the storage devices 176a-176k both age and fill up with data, extra parity information may be removed from the RAID array as described above. The metadata, the user data, corresponding intra-device redundancy information and some of the inter-device redundancy information remains. Regarding the above example with an 8+2 RAID array, the information stored in storage devices 176a-176j remains. However, extra inter-device redundancy information, or extra parity information, may be removed from the RAID array. For example, extra parity information stored in storage device 176k may be removed from the RAID stripes.

The information that remains, such as the information stored in storage devices 176a-176j in the above example, may remain in place. The storage space storing the extra parity information, such as the corresponding pages in storage device 176k in the above example, may be reused and reallocated for subsequent write operations. In one embodiment, each new allocation receives a new virtual address. Each new allocation may have any given size, any given alignment or geometry, and may fit in any given storage space (either virtual or physical). In one embodiment, each one of the storage devices 176a-176k and each allocated page within a storage device have a header comprising identification information. This identification information may allow the reuse of storage space for freed extra parity information without changing a given configuration.

In an embodiment wherein one or more of the storage devices 176a-176k is an SSD, an erase block is erased prior to reprogramming one or more pages within the erase block. Therefore, in an embodiment wherein storage device 176k is an SSD, corresponding erase blocks are erased prior to reprogramming freed pages in storage device 176k. Regarding the above example with an original 8+2 RAID array, one or more erase blocks are erased in storage device 176k within stripes 250a-250b prior to reprogramming pages with data 210. The original 8+2 RAID array is now an 8+1 RAID array with storage device 176j providing the single parity information for RAID stripes written prior to the parity shredding.

As is well known to those skilled in the art, during a read or write failure for a given storage device, data may be reconstructed from the supported inter-device parity information within a corresponding RAID stripe. The reconstructed data may be written to the storage device. However, if the reconstructed data fails to be written to the storage device, then all the data stored on the storage device may be rebuilt from corresponding parity information. The rebuilt data may be relocated to another location. With Flash memory, a Flash Translation Layer (FTL) remaps the storage locations of the data. In addition, with Flash memory, relocation of data includes erasing an entire erase block prior to reprogramming corresponding pages within the erase block. Maintaining mapping tables at a granularity of erase blocks versus pages allows the remapping tables to be more compact. Further, during relocation, extra pages that were freed during parity shredding may be used.

Offset Parity

Figure 10:
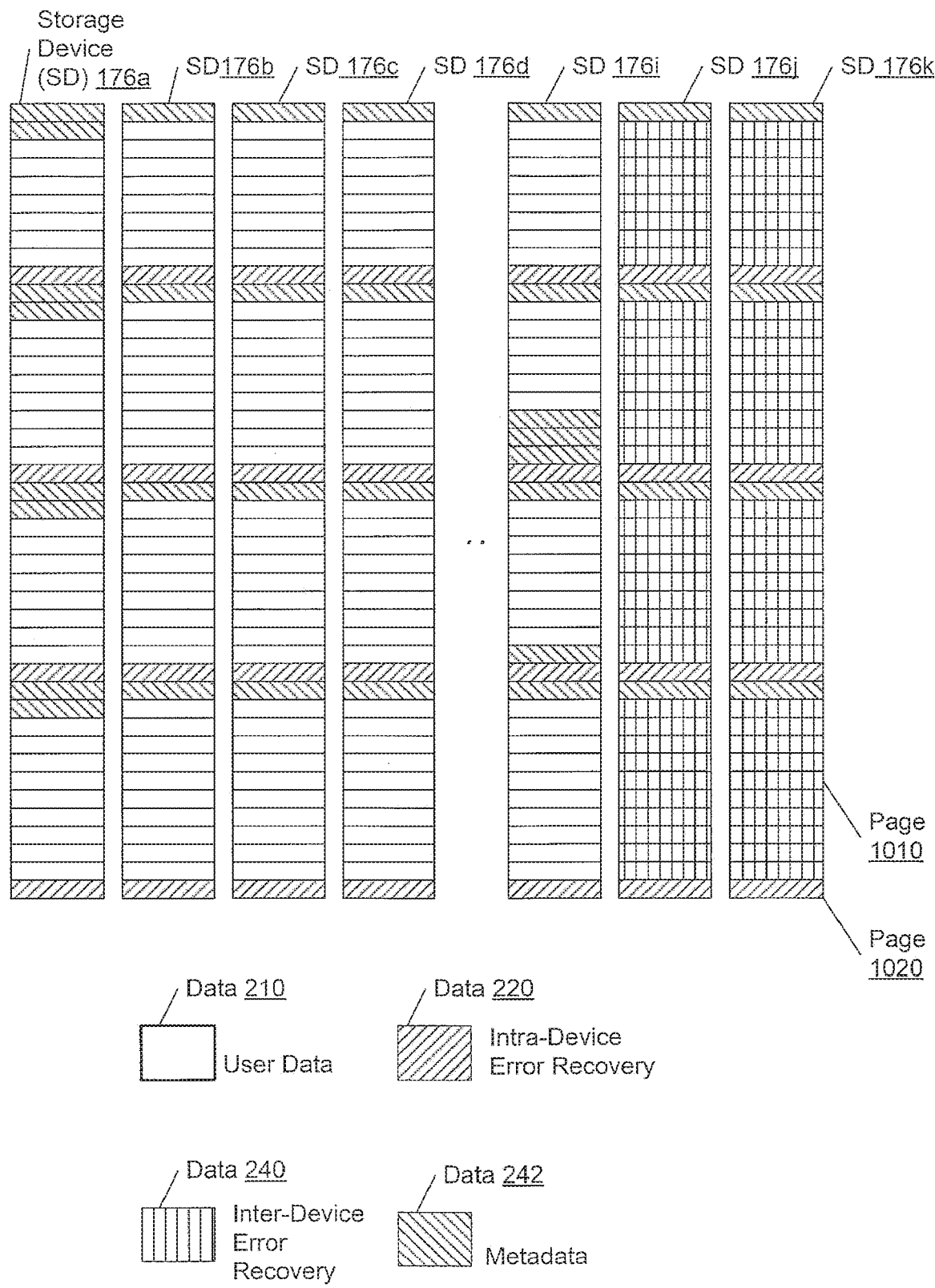
FIG. 10 is a generalized block diagram illustrating yet another embodiment of a flexible RAID data layout architecture.

Turning now to FIG. 10, a generalized block diagram illustrating yet another embodiment of a flexible RAID data layout architecture is shown. Similar to the generalized block diagram shown in FIG. 8, a flexible RAID data layout architecture may be used. The storage devices 176a-176k comprise multiple RAID stripes laid out across multiple storage devices. Although each of the storage devices 176a-

176k comprises multiple pages, only page 1010 and page 1020 are labeled for ease of illustration. In the example shown, a double parity RAID data layout is chosen, wherein storage devices 176j and 176k store double parity information.

Each of the pages in the storage devices 176a-176k stores a particular type of data. Some pages store user data 210 and corresponding generated inter-device parity information 240. Other pages store corresponding generated intra-device parity information 220. Yet other pages store metadata 242. The metadata 242 may include page header information, RAID stripe identification information, log data for one or more RAID stripes, and so forth. In addition to inter-device parity protection and intra-device parity protection, each of the pages in storage devices 176a-176k may comprise additional protection such as a checksum stored within each given page. In various embodiments, the single metadata page at the beginning of each stripe may be rebuilt from the other stripe headers. Alternatively, this page could be at a different offset in the parity shard so the data can be protected by the inter-device parity. A "shard" represents a portion of a device. Accordingly, a parity shard refers to a portion of a device storing parity data.

Physical Layer

In various embodiments, the systems described herein may include a physical layer through which other elements of the system communicate with the storage devices. For example, scheduling logic, RAID logic, and other logic may communicate with the storage devices via a physical layer comprising any suitable combination of software and/or hardware. In general, the physical layer performs a variety of functions including providing access to persistent storage, and performing functions related to integrity of data storage.

Figure 11A:
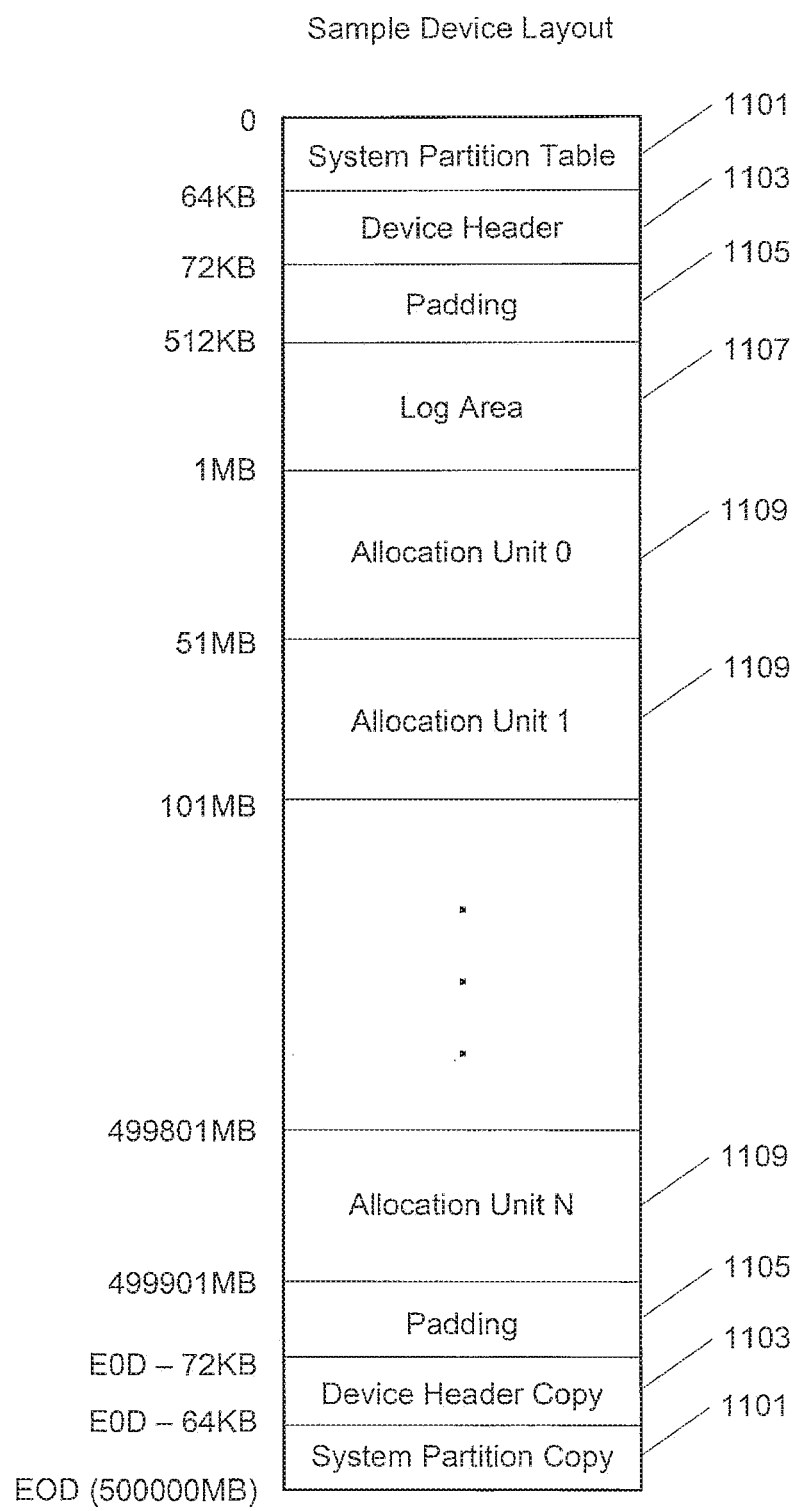
FIG. 11A illustrates one embodiment of a device layout.

FIG. 11A illustrates one embodiment of a hypothetical device layout for a 500 GB device. In various embodiments, the storage devices described herein may be formatted with a partition table 1101 at the beginning of the device, and a copy of the partition table at the end of the device. Additionally, a device header 1103 may be stored in the first and last blocks. For example, in a flash based storage device, a device header may be stored in the first and last erase blocks. As previously discussed, an erase block is a flash construct that is typically in the range of 256 KB-1 MB. Additional unused space in the first erase block may be reserved (padding 1105). The second erase block in each device may be reserved for writing logging and diagnostic information 1107. The rest of the erase blocks in between are divided into Allocation Units (AUs) 1109 of a multiple erase blocks. The AU size may be chosen so there are a reasonable number of AUs per device for good allocation granularity. In one embodiment, there may be something in the range of 10,000 AUs on a device to permit allocation in large enough units to avoid overhead, but not too many units for easy tracking. Tracking of the state of an AU (allocated/free/erased/bad) may be maintained an AU State Table. The wear level of an AU may be maintained in a Wear Level Table, and a count of errors may be maintained in an AU Error Table.

Figure 11B:
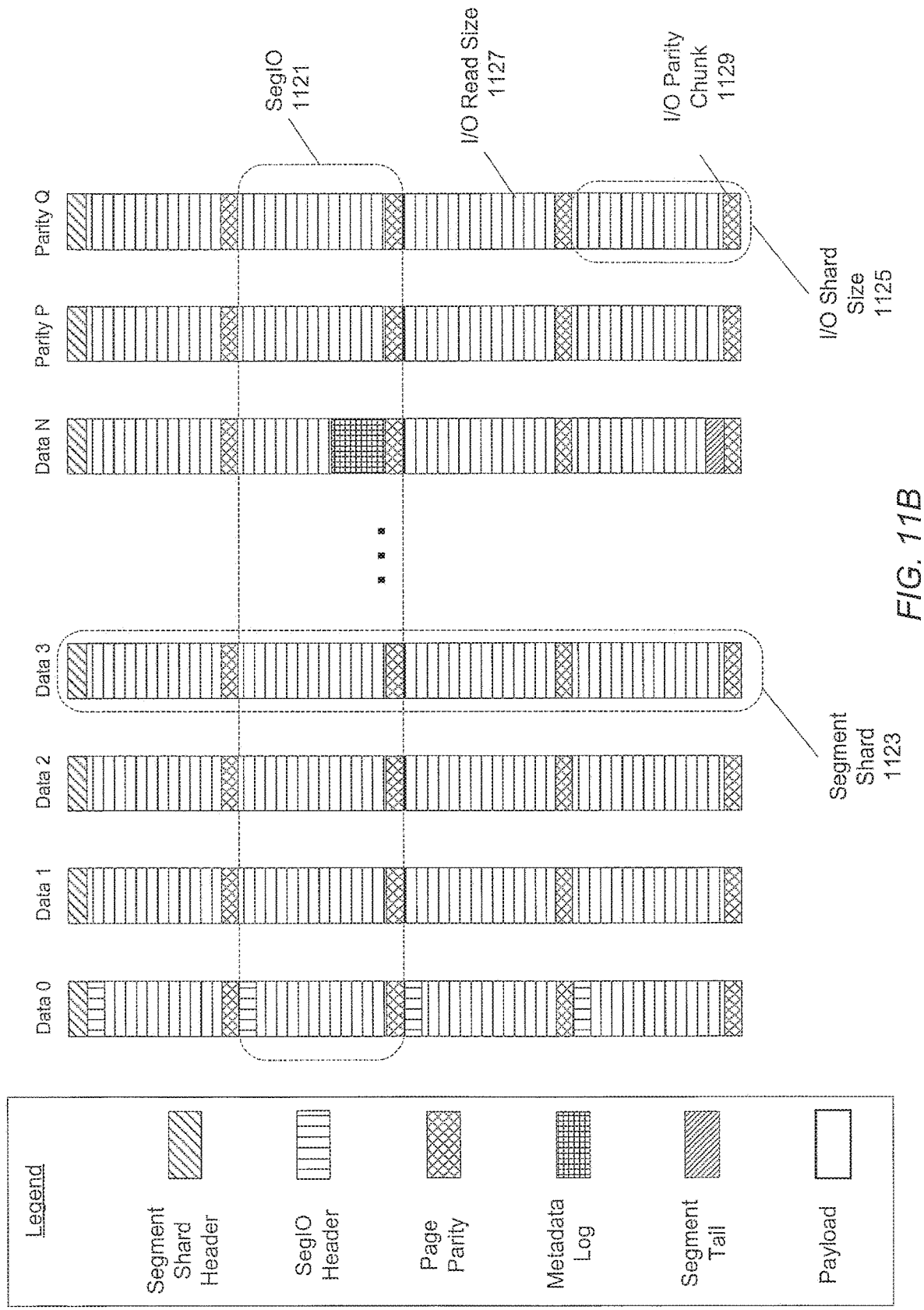
FIG. 11B illustrates one embodiment of a segment.

In various embodiments, the physical layer allocates space in segments which include one segment shard in each device across a set of devices (which could be on different nodes). FIG. 11B depicts one embodiment of a segment and various identifiable portions of that segment in one possible segment layout. In the embodiment shown, a single segment is shown stored in multiple devices. Illustrated are data devices Data 0-Data N, and parity devices Parity P and Parity Q. In one embodiment, each segment shard includes one or more allocation units on a device such that the size of the shard is equal on each device. Segment shard 1123 is called out to illustrate a segment shard. Also illustrated if FIG. 11B, is an I/O read size 1127 which in one embodiment corresponds to a page. Also shown is an I/O parity chunk 1129 which may include one or more pages of page parity for the I/O shard.

In one embodiment, each segment will have its own geometry which may include one or more of the following parameters:

(1) RAID level—The RAID level used for cross device protection in the segment. This may determine mirroring, parity, or ECC RAID and how many segment shards contain parity.

(2) Device Layout I/O shard size—This represents the size used to stripe across each device during a write. This will typically be in the range of 256 KB to 1 MB and probably be a multiple of the erase block size on each device. FIG. 11B calls out I/O shard size 1125 for purposes of illustration.

(3) I/O read size—This is a logical read size. Each I/O shard may be formatted as a series of logical pages. Each page may in turn include a header and a checksum for the data in the page. When a read is issued it will be for one or more logical pages and the data in each page may be validated with the checksum.

(4) I/O shard RAID level—The I/O shard has intra-shard parity to handle latent errors found during a rebuild. This parameter determines what type of parity is used for intra-shard protection and thus how many copies of the intra-shard parity will be maintained.

(5) I/O parity chunk—In various embodiments, the storage devices may do ECC on a page basis. Consequently, if an error is seen it is likely to indicate failure of an entire physical page. The I/O parity chunk is the least common multiple of the physical page size on each device in the segment and the intra-shard parity is calculated by striping down the I/O shard in the larger of the I/O parity chunks or the I/O read size. Included may be one or more pages of page parity. In various embodiments, this parity may be used to rebuild data in the event of a failed checksum validation.

In various embodiments, as each new segment is written a RAID geometry for the segment will be selected. Selection of the RAID geometry may be based on factors such as the current set of active nodes and devices, and the type of data in the segment. For example if 10 nodes or devices are available then an (8+2) RAID 6 geometry may be chosen and the segment striped across the nodes to withstand two device or node failures. If a node then fails, the next segment may switch to a (7+2) RAID 6 geometry. Within the segment some of the segment shards will contain data and some will contain ECC (e.g., parity).

In one embodiment, there are five types of segments. Three of these segments correspond to the AU State Table, the AU Error Table, and the Wear Level Table. In some embodiments, these three segments may be mirrored for additional protection. In addition to these three segments, there are metadata segments which may also be additionally protected through mirroring. Finally there are Data segments which hold client blocks and log information. The log information contains update information associated with the client blocks in the segment. The data segments will likely be protected by RAID 6 as illustrated in FIG. 11B with Parity P and Parity Q shards. In addition to the above, a segment table is maintained as an in memory data structure that is populated at startup with information from the headers of all the segment shards. In some embodiments, the table may be cached completely on all nodes so any node can translate a storage access to a physical address. However, in other embodiments an object storage model may be used where each node may have a segment table that can take a logical reference and identify the segment layout node where the data is stored. Then the request would be passed to the node to identify the exact storage location on the node. FIG. 11B also depicts segment tail data which identifies any (volume, snapshot) combinations that take up a significant amount of space in the segment. When snapshots are removed, a data scrubber may help identify segments for garbage collection based on this data.

In one embodiment, the basic unit of writing is the segio which is one I/O shard on each of the devices in the segment. Each logical page in the segio is formatted with a page header that contains a checksum (which may be referred to as a "media" checksum) of the page so the actual page size for data is slightly smaller than one page. For pages in the parity shards of a segment the page header is smaller so that the page checksums in the data page are protected by the parity page. The last page of each I/O shard is a parity page that again has a smaller header and protects all the checksums and page data in the erase block against a page failure. The page size referred to here is the I/O read size which may be one or more physical flash pages. For some segments, a read size smaller than a physical page may be used. This may occur for metadata where reads to lookup information may be index driven and smaller portion of data may be read while still obtaining the desired data. In such a case, reading half a physical page would mean tying up the I/O bus (and network) with less data and validating (e.g., checksumming) less data. To support a read size smaller than a physical page, an embodiment may include multiple parity pages at the end of the erase block such that the total size of all the parity pages is equal to the flash page size.

As the wear level of an erase block increases, the likelihood of an error increases. In addition to tracking wear levels, data may be maintained regarding observed how often errors are seen on an erase block and blocks with a higher probability of error identified. For some erase blocks, it may be decided to keep double or triple error correcting parity at the end of the erase block instead of the single RAID 5 parity. In this case, the data payload of the segio may be reduced accordingly. It may only be necessary to reduce the poor erase block within the segio, rather than all the erase blocks. The page headers in the erase block may be used to identify which pages are parity and which are data.

Whenever a page is read from storage, the contents may be validated using the page checksum. If the validation fails, a rebuild of the data using the erase block parity may be attempted. If that fails, then cross device ECC for the segment may be used to reconstruct the data.

In data segments the payload area may be divided into two areas. There will be pages formatted as log data which may include updates related to stored client blocks. The remainder of the payload area may contain pages formatted as client blocks. The client block data may be stored in a compressed form. Numerous compression algorithms are possible and are contemplated. Additionally, in various embodiments Intel® Advanced Encryption Standard instructions may be used for generating checksums. Additionally, there may be a header for the client block that resides in the same page as the data and contains information needed to read the client block, including an identification of the algorithm used to compress the data. Garbage collection may utilize both the client block header and the log entries in the segio. In addition, the client block may have a data hash which may be a checksum of the uncompressed data used for deduplication and to check the correctness of the decompressed data.

In some embodiments, segments and segios may have a monotonically increasing ID number used to order them. As part of writing a segio, a logical layer can record dependencies on prior flushes. At startup, the physical layer may build an ordered list of segments and segios and if a segio is dependent on another uncompleted segio it may be rolled back and not considered to have been written.

Wear Level Table

The Wear Level Table (WLT) for each device may be stored in a segment local to each device. The information may also be stored in the header of each segment shard. In one embodiment, the wear information is an integer that represents the number of times the allocation unit has been erased and reused. As the wear information may not be accurate, a flush of the table to the device may be performed when there has been a certain amount of activity or when the system has been idle for a reasonable period. The WLT may also be responsible for cleaning up old WLT segments as it allocates new ones. To add an extra layer of protection, old copies may be maintained before freeing them. For example, a table manager may ensure that it keeps the previous erase block and the current erase block of WLT entries at all times. When it allocates a new segment it won't free the old segment until it has written into the second erase block of the new segment.

AU State Table

The AU State Table (AST) tracks the state of each AU. The states include Free, Allocated, Erased and Bad. The AST may be stored in a segment on the device. Changing a state to Allocated or Free may be a synchronous update, while changing a state to Bad or Erased may be an asynchronous update. This table may generally be small enough and have enough updates that updates may be logged in NVRAM. The AST may be responsible for cleaning up old AST segments as it allocates new ones. Since the AST can be completely recovered by scanning the first block of each AU on the drive, there is no need to keep old copies of the AST.

AU Error Table

The AU Error Table (AET) may be used to track the number of recoverable errors and unrecoverable errors within each AU. The AET is stored in a segment on the device and each field may be a two byte integer. With four bytes per AU the entire table may be relatively small.

Figure 11C:
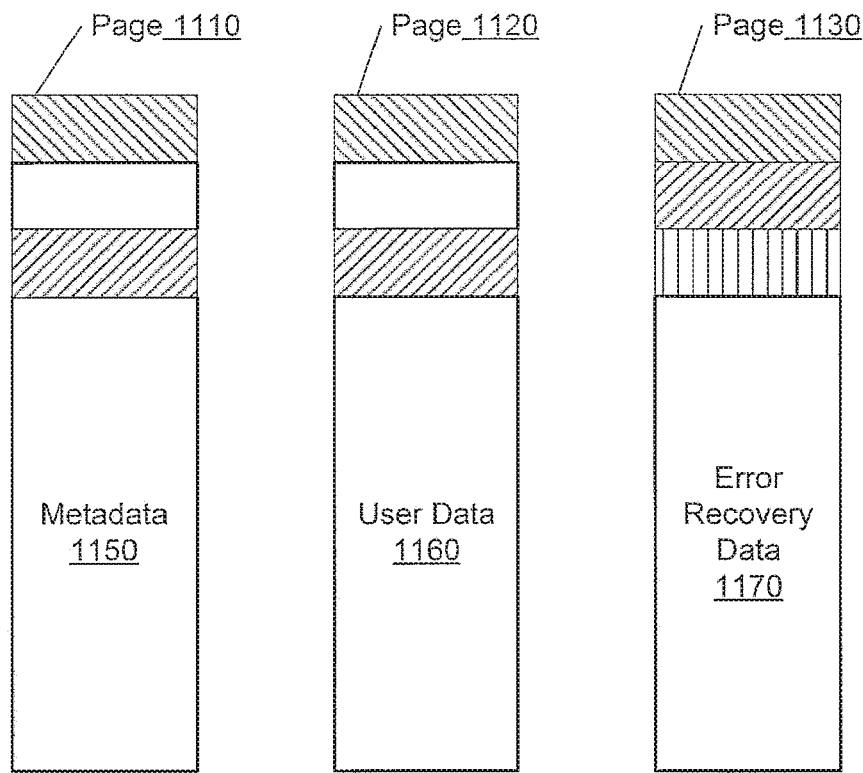
FIG. 11C is a generalized block diagram illustrating one embodiment of data storage arrangements within different page types.
Figure 11C:
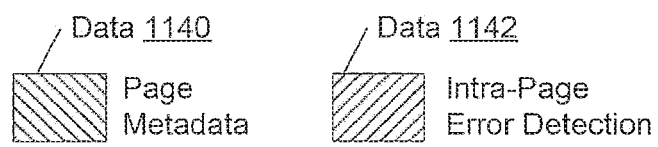
Figure 11C:
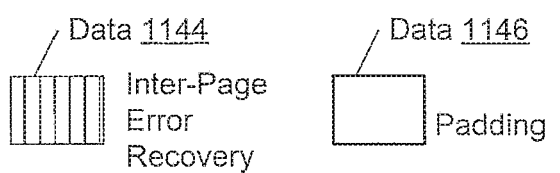

Referring now to FIG. 11C, a generalized block diagram illustrating one embodiment of data storage arrangements within different page types is shown. In the embodiment shown, three page types are shown although other types are possible and contemplated. The shown page types include page 1110 comprising metadata 1150, page 1120 comprising user data 1160, and page 1130 comprising parity information 1170 (inter-device or intra-device). Each of the pages 1110-1130 comprises metadata 1140, which may include header and identification information. In addition, each of the pages 1110-1130 may comprise intra-page error recovery data 1142, such as a corresponding checksum or other error detecting and/or correcting code. This checksum value may provide added protection for data stored in storage devices 176a-176k in a given device group.

Further, page 1130 may comprise inter-page error recovery data 1144. The data 1144 may be ECC information derived from the intra-page data 1142 stored in other storage devices. For example, referring again to FIG. 10, each page within storage device 176j, which stores inter-device parity information 240, may also store inter-page error recovery data 1144. The data 1144 may be a parity, a checksum, or other value generated from intra-page error recovery data 1142 stored in one or more of the storage devices 176a-176i. In one embodiment, the data 1144 is a checksum value generated from one or more other checksum values 1142 stored in other storage devices. In order to align data 1144 in a given page in storage device 176j with data 1142 in a corresponding page in one or more of the storage devices 176a-176i, padding 1146 may be added to the corresponding pages.

In one embodiment, end-user applications perform I/O operations on a sector-boundary, wherein a sector is 512 bytes for HDDs. In order to add extra protection, an 8-byte checksum may be added to form a 520-byte sector. In various embodiments, compression and remapping may be used in a flash memory based system to allow user data to be arranged on a byte boundary rather than a sector boundary. In addition, a checksum (8 byte, 4 byte, or otherwise) may be placed inside a page after a header and before the user data, which may be compressed. This placement is shown in each of pages 1110-1130.

When an end-user application reads a 512-byte sector, a corresponding page, which may be 2 KB-8 KB in size in one embodiment, has extra protection with an 8-byte checksum at the beginning of the page. In various embodiments, the page may not be formatted for a non-power of 2 sector size. As shown in pages 1110-1120, the checksum may be offset a few bytes into the page. This offset allows a parity page, such as page 1130, to store both a checksum that covers the parity page and ECC to protect checksums of the other pages.

For yet another level of protection, data location information may be included when calculating a checksum value. The data 1142 in each of pages 1110-1130 may include this information. This information may include both a logical address and a physical address. Sector numbers, data chunk and offset numbers, track numbers, plane numbers, and so forth may be included in this information as well.

Alternate Geometries

Figure 12:
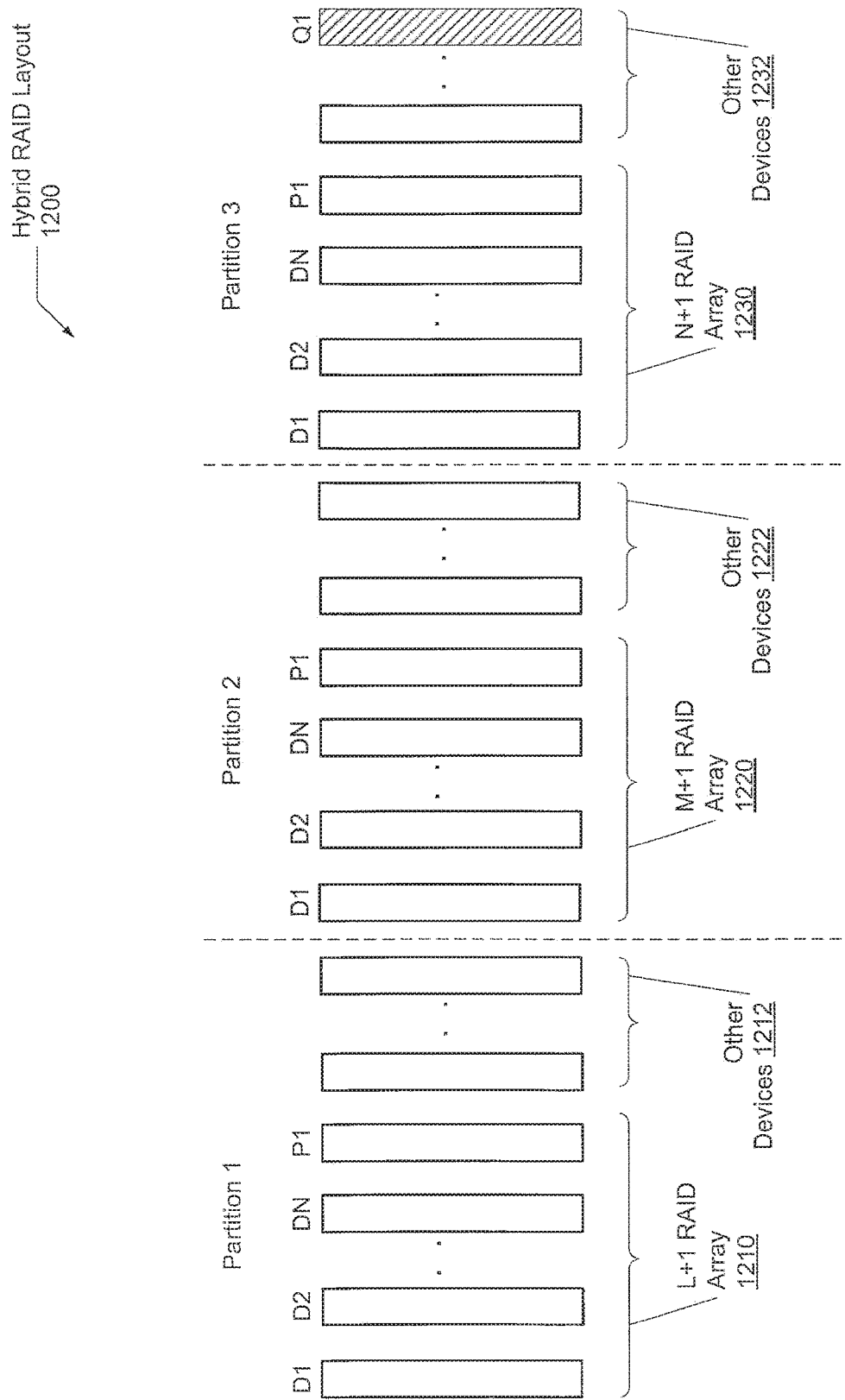
FIG. 12 is a generalized block diagram illustrating one embodiment of a hybrid RAID data layout.

Turning now to FIG. 12, a generalized block diagram illustrating one embodiment of a hybrid RAID data layout 1200 is shown. Three partitions are shown although any number of partitions may be chosen. Each partition may correspond to a separate device group, such as device groups 713a-173b shown in FIG. 1. Each partition comprises multiple storage devices. In one embodiment, an algorithm such as the CRUSH algorithm may be utilized to select which devices to use in a RAID data layout architecture to use for data storage.

In the example shown, an L+1 RAID array, M+1 RAID array, and N+1 RAID array are shown. In various embodiments, L, M, and N may all be different, the same, or a combination thereof. For example, RAID array 1210 is shown in partition 1. The other storage devices 1212 are candidates for other RAID arrays within partition 1. Similarly, RAID array 1220 illustrates a given RAID array in partition 2. The other storage devices 1222 are candidates for other RAID arrays within partition 2. RAID array 1230 illustrates a given RAID array in partition 3. The other storage devices 1232 are candidates for other RAID arrays within partition 3.

Within each of the RAID arrays 1210, 1220 and 1230, a storage device P1 provides RAID single parity protection within a respective RAID array. Storage devices D1-DN store user data within a respective RAID array. Again, the storage of both the user data and the RAID single parity information may rotate between the storage devices D1-DN and P1. However, the storage of user data is described as being stored in devices D1-DN. Similarly, the storage of RAID single parity information is described as being stored in device P1 for ease of illustration and description.

One or more storage devices among each of the three partitions may be chosen to provide an additional amount of supported redundancy for one or more given RAID arrays. For example, storage device Q1 in partition 3 may be combined with each of the RAID arrays 1210, 1220 and 1230. The storage device Q1 may provide RAID double parity information for each of the RAID arrays 1210, 1220 and 1230. This additional parity information is generated and stored when a stripe is written to one of the arrays 1210, 1220, or 1230. Further this additional parity information may cover stripes in each of the arrays 1210, 1220, and 1230. Therefore, the ratio of a number of storage devices storing RAID parity information to a total number of storage devices is lower. For example, if each of the partitions used N+2 RAID arrays, then the ratio of a number of storage devices storing RAID parity information to a total number of storage devices is $3(2)/(3(N+2))$, or $2/(N+2)$. In contrast, the ratio for the hybrid RAID layout 1200 is $(3+1)/(3(N+1))$, or $4/(3(N+1))$.

It is possible to reduce the above ratio by increasing a number of storage devices used to store user data. For example, rather than utilize storage device Q1, each of the partitions may utilize a 3N+2 RAID array. In such a case, the ratio of a number of storage devices storing RAID parity information to a total number of storage devices is $2/(3N+2)$. However, during a reconstruct read operation, (3N+1) storage devices receive a reconstruct read request for a single device failure. In contrast, for the hybrid RAID layout 1200, only N storage devices receive a reconstruct read request for a single device failure.

It is noted each of the three partitions may utilize a different RAID data layout architecture. A selection of a given RAID data layout architecture may be based on a given ratio number of storage devices storing RAID parity information to a total number of storage devices. In addition, the selection may be based on a given number of storage devices, which may receive a reconstruct read request during reconstruction. For example, the RAID arrays 1210, 1220 and 1230 may include geometries such as L+a, M+b and N+c, respectively.

In addition, one or more storage devices, such as storage device Q1, may be chosen based on the above conditions to provide an additional amount of supported redundancy for one or more of the RAID arrays within the partitions. In an example with three partitions comprising the above RAID arrays and a number Q of storage devices providing extra protection for each of the RAID arrays, a ratio of a number of storage devices storing RAID parity information to a total number of storage devices is $(a+b+c+Q)/(L+a+M+b+N+c+Q)$. For a single device failure, a number of storage devices to receive a reconstruct read request is L, M and N, respectively, for partitions 1 to 3 in the above example. It is noted that the above discussion generally describes 3 distinct partitions in FIG. 12. In such an embodiment, this type of "hard" partitioning where a given layout is limited to a particular group of devices may guarantee that reconstruct reads in one partition will not collide with those in another partition. However, in other embodiments the partitions may not be hard as described above. Rather, given a pool of devices, layouts may be selected from any of the devices. For example, treating the devices as on big pool it is possible to configure layouts such as (L+1, M+1, N+1)+1. Consequently, there is a chance that geometries overlap and reconstruct reads could collide. If L, M, and N are small relative to the size of the pool then the percentage of reconstruct reads relative to normal reads may be kept low.

Figure 13:
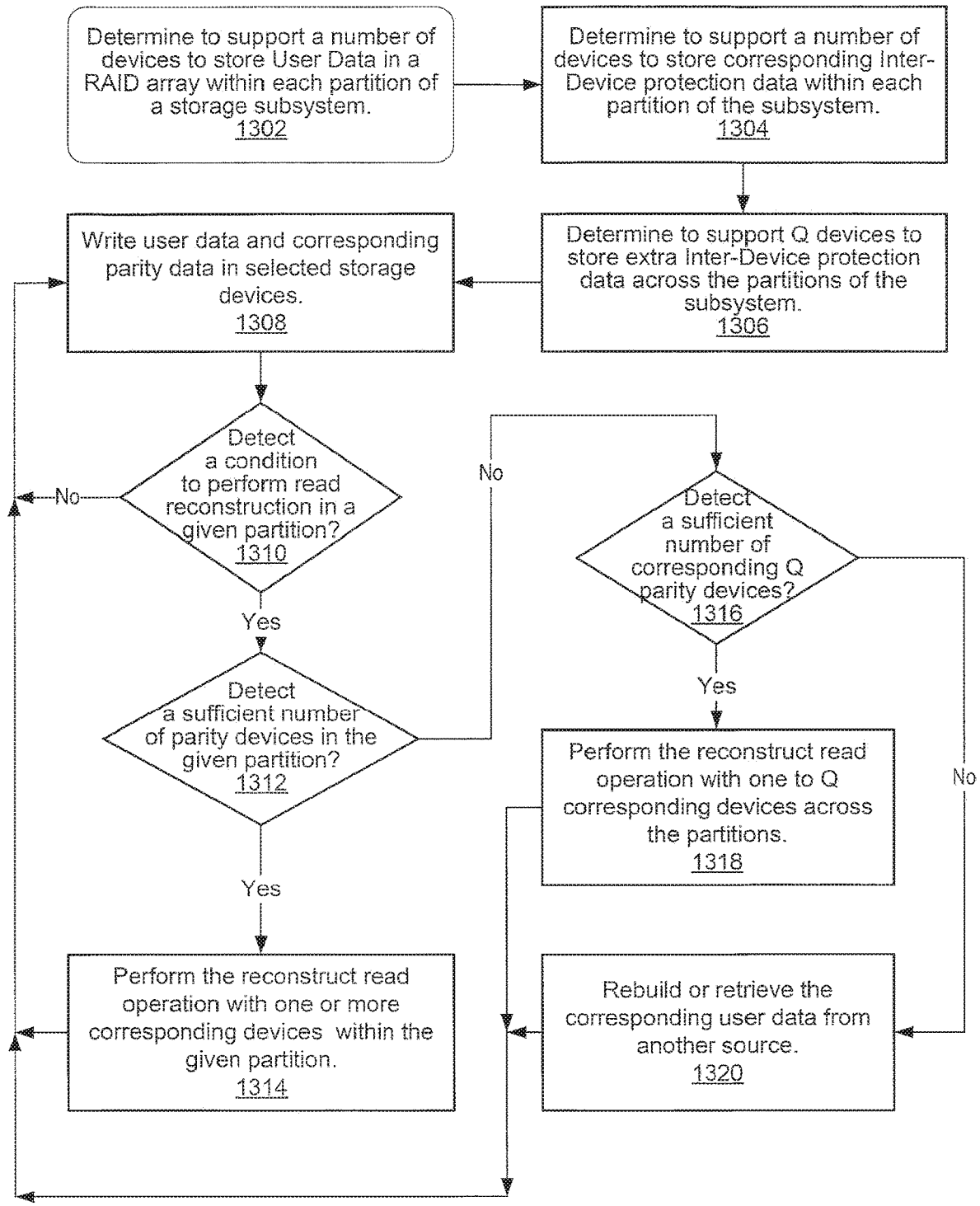
FIG. 13 is a generalized flow diagram illustrating one embodiment of a method for selecting alternate RAID geometries in a data storage subsystem.

Referring now to FIG. 13, one embodiment of a method 1300 for selecting alternate RAID geometries in a data storage subsystem is shown. The components embodied in network architecture 100 and data storage arrays 120a-120b described above may generally operate in accordance with method 1300. The steps in this embodiment are shown in sequential order. However, some steps may occur in a different order than shown, some steps may be performed concurrently, some steps may be combined with other steps, and some steps may be absent in another embodiment.

In block 1302, a RAID engine 178 or other logic within a storage controller 174 determines to use a given number of devices to store user data in a RAID array within each partition of a storage subsystem. A RUSH or other algorithm may then be used to select which devices are to be used. In one embodiment, each partition utilizes a same number of storage devices. In other embodiments, each partition may utilize a different, unique number of storage devices to store user data. In block 1304, the storage controller 174 may determine to support a number of storage devices to store corresponding Inter-Device Error Recovery (parity) data within each partition of the subsystem. Again, each partition may utilize a same number or a different, unique number of storage devices for storing RAID parity information.

In block 1306, the storage controller may determine to support a number Q of storage devices to store extra Inter-Device Error Recovery (parity) data across the partitions of the subsystem. In block 1308, both user data and corresponding RAID parity data may be written in selected storage devices. Referring again to FIG. 12, when a given RAID array is written, such as RAID array 1210 in partition 1, one or more bits of parity information may be generated and stored in storage device Q1 in partition 3.

If the storage controller 174 detects a condition for performing read reconstruction in a given partition (conditional block 1310), and if the given partition has a sufficient number of storage devices holding RAID parity information to handle a number of unavailable storage devices (conditional block 1312), then in block 1314, the reconstruct read operation(s) is performed with one or more corresponding storage devices within the given partition. The condition may include a storage device within a given RAID array is unavailable due to a device failure or the device operates below a given performance level. The given RAID array is able to handle a maximum number of unavailable storage devices with the number of storage devices storing RAID parity information within the given partition. For example, if RAID array 1210 in partition 1 in the above example is an L+a RAID array, then RAID array 1210 is able to perform read reconstruction utilizing only storage devices within partition 1 when k storage devices are unavailable, where 1<=k<=a.

If the given partition does not have a sufficient number of storage devices holding RAID parity information to handle a number of unavailable storage devices (conditional block 1312), and if there is a sufficient number of Q storage devices to handle the number of unavailable storage devices (conditional block 1316), then in block 1318, the reconstruct read operation(s) is performed with one or more corresponding Q storage devices. One or more storage devices in other partitions, which are storing user data, may be accessed during the read reconstruction. A selection of these storage devices may be based on a manner of a derivation of the parity information stored in the one or more Q storage devices. For example, referring again to FIG. 12, storage device D2 in partition 2 may be accessed during the read reconstruction, since this storage device may have been used to generate corresponding RAID parity information stored in storage device Q1. If there are not a sufficient number of Q storage devices to handle the number of unavailable storage devices (conditional block 1316), then in block 1320, the corresponding user data may be read from another source or be considered lost.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of storage devices coupled to a storage controller, wherein the plurality of storage devices store a plurality of RAID stripes and are partitioned into a plurality of partitions, wherein for a given redundant array of independent drives (RAID) stripe, the storage controller is configured to:
   generate intra-device protection data protecting data within a first page of the RAID stripe on a single storage device, wherein the intra-device protection data is stored within a first storage device of the plurality of storage devices; and
   generate inter-device protection data protecting the data across multiple storage devices including the intra-device protection data of the first page, wherein the inter-device protection data is stored at pages of storage devices within each partition of the plurality of partitions.

2. The computer system as recited in claim 1, wherein the intra-device protection data is a checksum value computed from corresponding data stored in the first storage device.

3. The computer system as recited in claim 1, wherein the inter-device protection data is configured to protect the intra-device protection data.

4. The computer system as recited in claim 1, wherein the intra-device protection data further includes one or both of a physical address or a virtual address corresponding to the data stored within the first storage device.

5. The computer system as recited in claim 4, wherein in response to a read of data in the first storage device, the storage controller is configured to utilize at least one of the physical address or the virtual address to validate the read data.

6. The computer system as recited in claim 1, wherein in response to a read of given data in the first storage device, the storage controller is configured to:
   utilize intra-device protection data using control logic within the storage controller to attempt to rebuild the given data, in response to determining a checksum validation for the given data has failed; and
   utilize inter-device protection data using control logic within the storage controller to reconstruct the given data, in response to determining the rebuild has failed.

7. The computer system as recited in claim 1, wherein said first storage device comprises one or more client blocks storing compressed data, and wherein the first storage device further includes additional protection data for each of the client blocks, the additional data being configured to validate corresponding data in an uncompressed state.

8. A method for use in a computing system, the method comprising:
   a storage controller coupled to a plurality of storage devices, wherein the plurality of storage devices store a plurality of RAID stripes and are partitioned into a plurality of partitions, wherein for a given redundant array of independent drives (RAID) stripe, the storage controller is configured to:
   generate intra-device protection data protecting data within a first page of a RAID stripe on a single storage device, wherein the intra-device protection data is stored within a first storage device of the plurality of storage devices; and
   generate inter-device protection data protecting the intra-device protection data across multiple storage devices including the intra-device protection data of the first page, wherein the inter-device protection data is stored at pages of storage devices within each partition of the plurality of partitions.

9. The method as recited in claim 8, further comprising computing the intra-device protection data as a checksum value based on data stored in the first page of the first storage device.

10. The method as recited in claim 9, further comprising:
    receiving read and write requests at a data storage subsystem, wherein the subsystem comprises a plurality of data storage locations on a plurality of storage devices; and
    storing data in a first storage device of the plurality of storage devices.

11. The method as recited in claim 8, wherein the intra-device protection data is configured to protect the inter-device protection data.

12. The method as recited in claim 8, wherein the intra-device protection data in the first storage device further includes one or both of a physical address or a virtual address corresponding to the data stored within the first storage device.

13. The method as recited in claim 12, wherein in response to a read of data in the first storage device, the method comprises utilizing at least one of the physical address or the virtual address to validate the read data.

14. The method as recited in claim 8, wherein in response to a read of given data in the first storage device, the method further comprises:
    utilizing intra-device protection data using control logic within a storage controller to attempt to rebuild the given data, in response to determining a checksum validation for the given data has failed; and
    utilizing inter-device protection data using control logic within the storage controller to reconstruct the given data, in response to determining the rebuild has failed.

15. The method as recited in claim 8, wherein said first storage device comprises one or more client blocks storing compressed data, and wherein the first storage device further includes additional protection data for each of the client blocks, the additional data being configured to validate corresponding data in an uncompressed state.

16. A non-transitory computer readable storage medium storing program instructions implemented by a storage controller coupled to a plurality of storage devices, wherein the plurality of storage devices store a plurality of RAID stripes and are partitioned into a plurality of partitions, wherein for a given redundant array of independent drives (RAID) stripe, the program instructions are executable to:
   generate intra-device protection data protecting data within a first page of a RAID stripe on a single storage device, wherein the intra-device protection data is stored within a first storage device of the plurality of storage devices; and
   generate inter-device protection data protecting the intra-device protection data across multiple storage devices including the intra-device protection data of the first page, wherein the inter-device protection data is stored at pages of storage devices within each partition of the plurality of partitions.

17. The non-transitory computer readable storage medium as recited in claim 16, wherein the program instructions are further executable to compute the intra-device protection data in the first storage device as a checksum value based on data stored in the first storage device.

18. The non-transitory computer readable storage medium as recited in claim 16, wherein the first storage device is formatted to a multiple of 512 sector size such that a first page is aligned to a multiple of 512 boundary, and wherein the program instructions are further executable to compress the data in the first page in order to accommodate storage of the intra-device protection data within the first page.

19. The non-transitory computer readable storage medium as recited in claim 16, wherein the intra-device protection data in the first storage device further includes one or both of a physical address or a virtual address corresponding to the data stored within the first storage device.

20. The non-transitory computer readable storage medium as recited in claim 19, wherein in response to a read of data in the first storage device, the wherein the program instructions are further executable to utilize at least one of the physical address or the virtual address to validate the read data.

* * * * *